United States Patent [19]
Suzuki

[11] Patent Number: 6,044,106
[45] Date of Patent: Mar. 28, 2000

[54] RECEIVING METHOD AND APPARATUS IN WHICH A DEMODULATING STATUS IS DETERMINED AND A NOISE POWER IS DETECTED

[75] Inventor: Mitsuhiro Suzuki, Chiba, Japan

[73] Assignee: Sony Corporation, Tokyo, Japan

[21] Appl. No.: 08/861,162

[22] Filed: May 21, 1997

[30] Foreign Application Priority Data

May 27, 1996 [JP] Japan .............................. P08-132436

[51] Int. Cl.[7] .................................................. H04B 17/00
[52] U.S. Cl. ......................... 375/219; 375/227; 375/285; 375/324; 455/226.1
[58] Field of Search ..................................... 375/227, 324, 375/340, 345, 346, 219, 285; 329/320, 353; 455/226.3, 226.1

[56] References Cited

U.S. PATENT DOCUMENTS

| | | | |
|---|---|---|---|
| 4,799,025 | 1/1989 | Le Queau ................................ | 329/108 |
| 5,157,694 | 10/1992 | Iwasaki et al. ......................... | 375/327 |
| 5,901,173 | 5/1999 | Stephens et al. ....................... | 375/227 |

*Primary Examiner*—Amanda T. Le
*Attorney, Agent, or Firm*—Jay H. Maioli

[57] ABSTRACT

A noise detection apparatus includes a demodulator for demodulating an input signal, a determining circuit for determining a status of an output signal of the demodulator, a modulator for modulating a symbol of an output of the determining circuit, and a subtractor for subtracting between the input signal and the output signal of the modulator, in which a noise power is detected from an output of the subtractor. A circuit quality detection apparatus includes a demodulator for demodulating an input signal, a determining circuit for determining a status of an output signal of the demodulator, a modulator for modulating a symbol of an output of the determining circuit, a subtractor for subtracting between the input signal and the output signal of the modulator, a first squaring circuit for squaring an output of the subtractor, a first averaging circuit for averaging an output signal of the first squaring circuit, a second squaring circuit for squaring the input signal, a second averaging circuit for averaging an output signal of the second squaring circuit, and a ratio calculating circuit for calculating a ratio of an output of the first averaging circuit to an output of the second averaging circuit. Information of circuit quality is then detected from the output of the ratio calculating circuit.

48 Claims, 18 Drawing Sheets

RECEIVING METHOD AND APPARATUS IN WHICH A DEMODULATING STATUS IS DETERMINED AND A NOISE POWER IS DETECTED

BACKGROUND OF THE INVENTION

1. Field of the Invention

The present invention relates to a signal receiving method and a signal receiving apparatus suitable for application to a radio telephone system, for example.

2. Description of the Related Art

In a mobile communication such as a radio telephone system or the like, a multiple access in which a plurality of mobile stations (terminal apparatus) or subscribers are permitted to access a single base station is employed. In this case of a radio telephone, a number of mobile stations commonly utilize a single base station. Therefore, various communication systems have been proposed for avoiding interference between respective mobile stations. For example, a frequency division multiple access system (FDMA: Frequency Division Multiple Access), a time division multiple access system (TDMA: Time Division Multiple Access), a code division multiple access system (CDMA: Code Division Multiple Access) and so on are conventionally proposed as this kind of communication systems.

Of these systems, the CDMA system is a multiple access system in which a particular code is assigned to each of the mobile stations, a modulated wave of an identical wave (carrier) is spread in spectrum with the code and then transmitted to the identical base station, and a reception side takes code synchronism based on each code to identify a desired mobile station.

Specifically, the base station occupies the whole frequency band owing to the spread spectrum, and transmits signals to respective mobile stations using an identical frequency band at the same time. Each of the mobile stations inversely spreads a signal of a fixed spread band width transmitted from the base station to extract a corresponding signal. Further, the base station discriminates each of the mobile stations from one another by different spread codes.

In the CDMA system, communication can be achieved at every direct calling so long as a code is shared. Further, the system is excellent in maintaining secrecy of a telephone conversation. Therefore, the system is suitable for a radio transmission utilizing mobile stations such as a portable telephone apparatus and so on.

In the CDMA system, it is difficult to establish a precise communication relationship between mobile stations. Therefore, each communication between respective mobile stations cannot be dealt with completely separately, and hence another mobile station can become a source of interference upon communication with a mobile station. Further, data is spread within a particular frequency band in this system. Therefore, it is necessary to define a band width in advance over which the data is spread (i.e., a band width for use of transmission). Therefore, it is difficult to change the transmission band width.

The above matter will be described more concretely. FIGS. 1A and 1B show a model in which a transmission signal of a particular user is extracted by an inverse spread from transmission signals of eight mobile stations (users) which are spectrum spread with predetermined codes and multiplexed, for example. As shown in FIG. 1A, if a signal of a user U0 is to be extracted by the inverse spread from signals of eight users U0 to U7 which are multiplexed with codes, then as shown in FIG. 1B, the signal of the user U0 can actually be extracted. However, signals of other users U1 to U7 which are dealt with by the same base station also become an interference source, serving as a noise. This fact results in deterioration of an S/N characteristic. For this reason, in a radio transmission employing the CDMA system, the electric wave does not reach well due to the deterioration caused by the interference, which fact narrows a service area. Further, interference due to other users can be suppressed only by an amount of inverse spread gain which is obtained in a process of spectrum inverse spread. Therefore, a number of users (mobile stations) permitted to access is limited and a channel capacity becomes small.

Furthermore, in a communication system in which this kind of multiple access is carried out, it is important to have uniform sending powers of respective transmission signals present at a time so as to fall within a constant range, in order to suppress interference due to other users. However, in the conventional communication system in which the multiple access such as the CDMA or the like is carried out, a processing for controlling the sending power has been not always carried out satisfactorily.

Specifically, when a sending power of a signal from a certain terminal apparatus is adjusted to fall within a constant range, the base station side receives the signal transmitted from the terminal apparatus and detects its transmission state. Then, control data of the transmission output based on the result of the detection is transmitted to the terminal apparatus. Then, the terminal apparatus side determines the transmission state based on the transmitted control data and carries out processing for adjusting the transmission output to a corresponding state.

Now, FIG. 2 shows an example of a conventional arrangement for detecting a transmission state based on a received signal (this example is not an example of an arrangement peculiar to the CDMA system but a general arrangement for receiving a differentially modulated signal). For example, a received signal is supplied to an AGC circuit (automatic gain control circuit) 1 in which the signal is made into a signal having a gain within a constant range. An output of the AGC circuit 1 is supplied to a differential demodulating circuit 2 in which it is demodulated, and its demodulated output is supplied to a symbol deciding circuit 3. An output of the symbol deciding circuit 3 and the output of the demodulating circuit 2 are supplied to a subtracter 4 in which the difference between both the signals is detected. The detected difference becomes an estimated value of noise power. In this case, the output of the subtracter 4 is squared by a squaring circuit 5 to produce an absolute value. An output thereof is averaged by an averaging circuit 6 to calculate a mean value of the noise power.

However, the received signal should be adjusted to a constant level by the AGC circuit for detecting the noise power with precision. When the interference power is fluctuated due to interference or the like, it is difficult to adjust the level by the AGC circuit with precision, and hence it is difficult to estimate the noise power accurately.

SUMMARY OF THE INVENTION

In view of such aspects, it is an object of the present invention to provide receiving apparatus and method which can satisfactorily detect a noise power of the transmission signal when a transmission system of such kind is employed.

According to a first aspect of the present invention, a noise detection apparatus includes demodulating means for demodulation an input signal, determining means for determining a status of an output signal of the demodulating means, modulating means for modulating a symbol of an output of the determining means, and subtracting means for subtracting between the input signal and the output signal of the modulating means, wherein the apparatus detects a noise power from an output of the subtracting means.

According to a second aspect of the present invention, a circuit quality detection apparatus includes demodulating means for demodulating an input signal, determining means for determining a status of an output signal of the demodulating means, modulating means for modulating a symbol of an output of the determining means, first squaring means for squaring an output signal of the subtracting means, first averaging means for averaging an output signal of the first squaring means, second squaring means for squaring the input signal, second averaging means for averaging an output signal of the second squaring means, and ratio calculating means for calculating a ratio of an output of the first averaging means to an output of the second averaging means. The apparatus detects information of circuit quality from an output of the ratio calculating means.

According to a third aspect of the present invention, a soft decision decoding apparatus includes demodulating means for demodulating an input signal, determining means for determining a status of an output signal of the demodulating means, modulating means for modulating a symbol of an output of the determining means, subtracting means for subtracting between the input signal and an output signal of the modulating means, first squaring means for squaring an output signal of the subtracting means, first averaging means for averaging an output signal of the first squaring means, second squaring means for squaring the input signal, second averaging means for averaging an output signal of the second squaring means, ratio calculating means for calculating a ratio of an output of the first averaging means to an output of the second averaging means, weight function generating means for generating means for generating weight function from an output of the ratio calculating means, and soft decision decoding means for soft-decoding a predetermined signal controlled by an output signal of the weight function generating means.

According to a fourth aspect of the present invention, a receiving apparatus includes RF signal processing means for processing a received RF signal, RF demodulating means for demodulating an output signal of the RF signal processing means, and decoding means for decoding an output signal of the RF demodulating means. The decoding means includes demodulating means for demodulating an output signal, determining means for determining a status of an output signal of the demodulating means, modulating means for modulating a symbol of an output of the determining means, subtracting means for subtracting between the input signal and an output signal of the modulating means, first squaring means for squaring an output signal of the first squaring means, second squaring means for squaring the input signal, second averaging means for averaging an output signal of the second squaring means, ratio calculating means for calculating a ratio of an output of the first averaging means to an output of the second averaging means, weight function generating means for generating weight function from an output of the ratio calculating means, and soft decision decoding means for soft-decoding a predetermined signal controlled by an output signal of the weight function generating means.

According to a fifth aspect of the present invention, a communication apparatus includes RF signal processing means for processing a received RF signal, RF demodulating means for demodulating an output signal of the RF signal processing means, decoding means for decoding an output signal of the RF demodulating means, encoding means for encoding a predetermined information signal, RF modulating means for modulating an output signal of the encoding means, and transmitting signal processing means for processing an output signal of the RF modulating means. The decoding means comprises demodulating means for demodulating an input signal, determining means for determining a status of an output signal of the demodulating means, modulating means for modulating a symbol of an output of the determining means, subtracting means for subtracting between the input signal and an output signal of the modulating means, first squaring means for squaring an output signal of the subtracting means, first averaging means for squaring the input signal, second averaging means for averaging an output signal of the second squaring means, and ratio calculating means for calculating a ratio of an output of the first averaging means to an output of the second averaging means. An output power of the transmitting signal processing means is controlled by an information of circuit quality derived from an output of the ratio calculating means.

DESCRIPTION OF THE PREFERRED EMBODIMENT

An embodiment of the present invention will hereinafter be described with reference to FIG. 3 to FIG. 20.

Initially, an arrangement of a communication system to which the present embodiment is applied will be described. The communication system of the present embodiment is arranged as a so-called multicarrier system in which a plurality of subcarriers are continuously disposed within a band allocated in advance, and the plurality of subcarriers within the single band are utilized on a single transmission path at the same time. Further the plurality of subcarriers within the single band are collectively divided in the band to be modulated. Here, this system is called a band division multiple access (BDMA: Band Division Multiple Access).

Figure 1A:
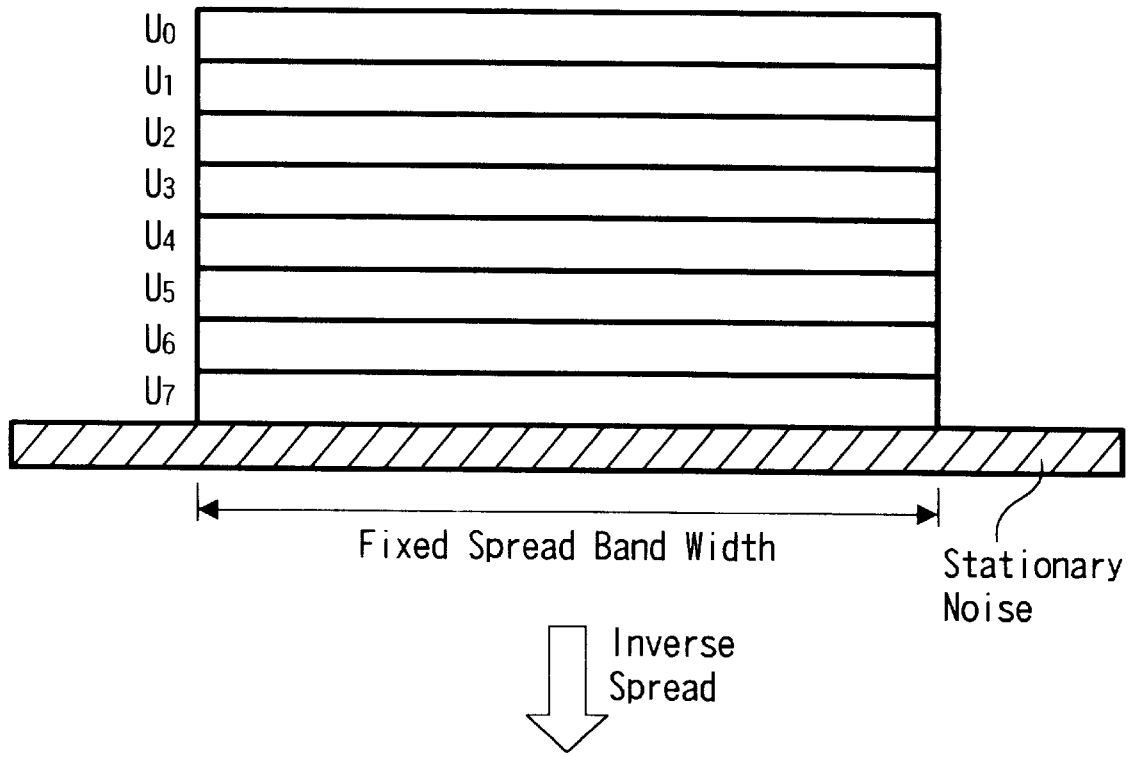
FIGS. 1A and 1B are diagrams used to explain an interference state in a CDMA system.
Figure 1B:
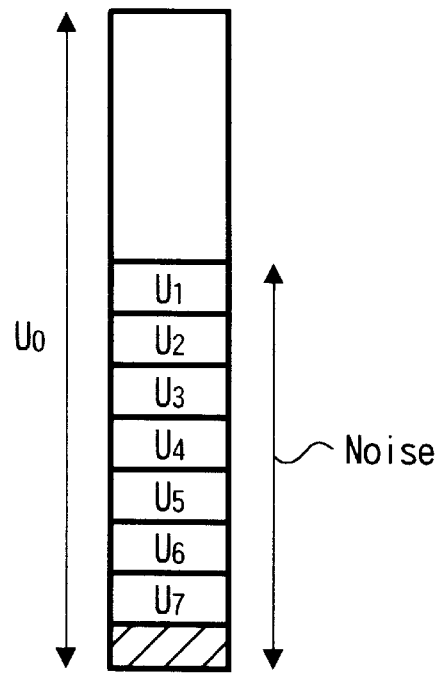
Figure 2:
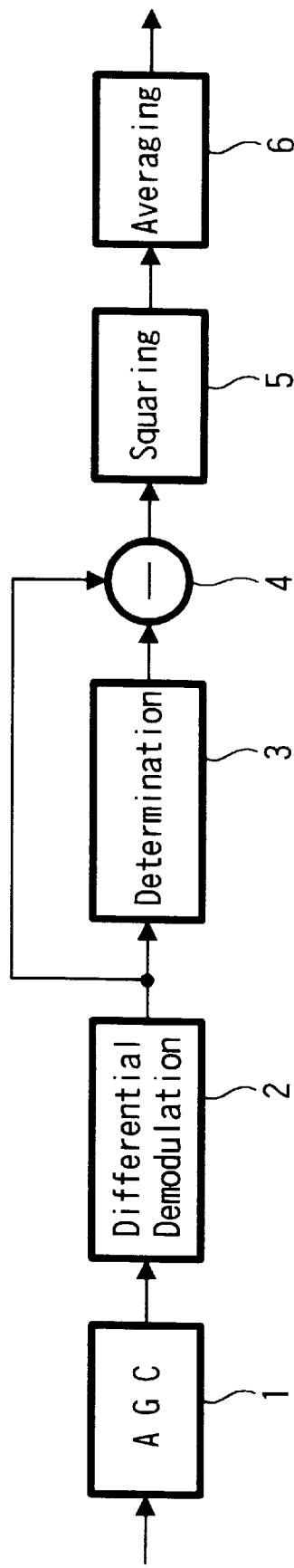
FIG. 2 is a block diagram showing an example of an arrangement for detecting a noise power according to the prior art.
Figure 3:
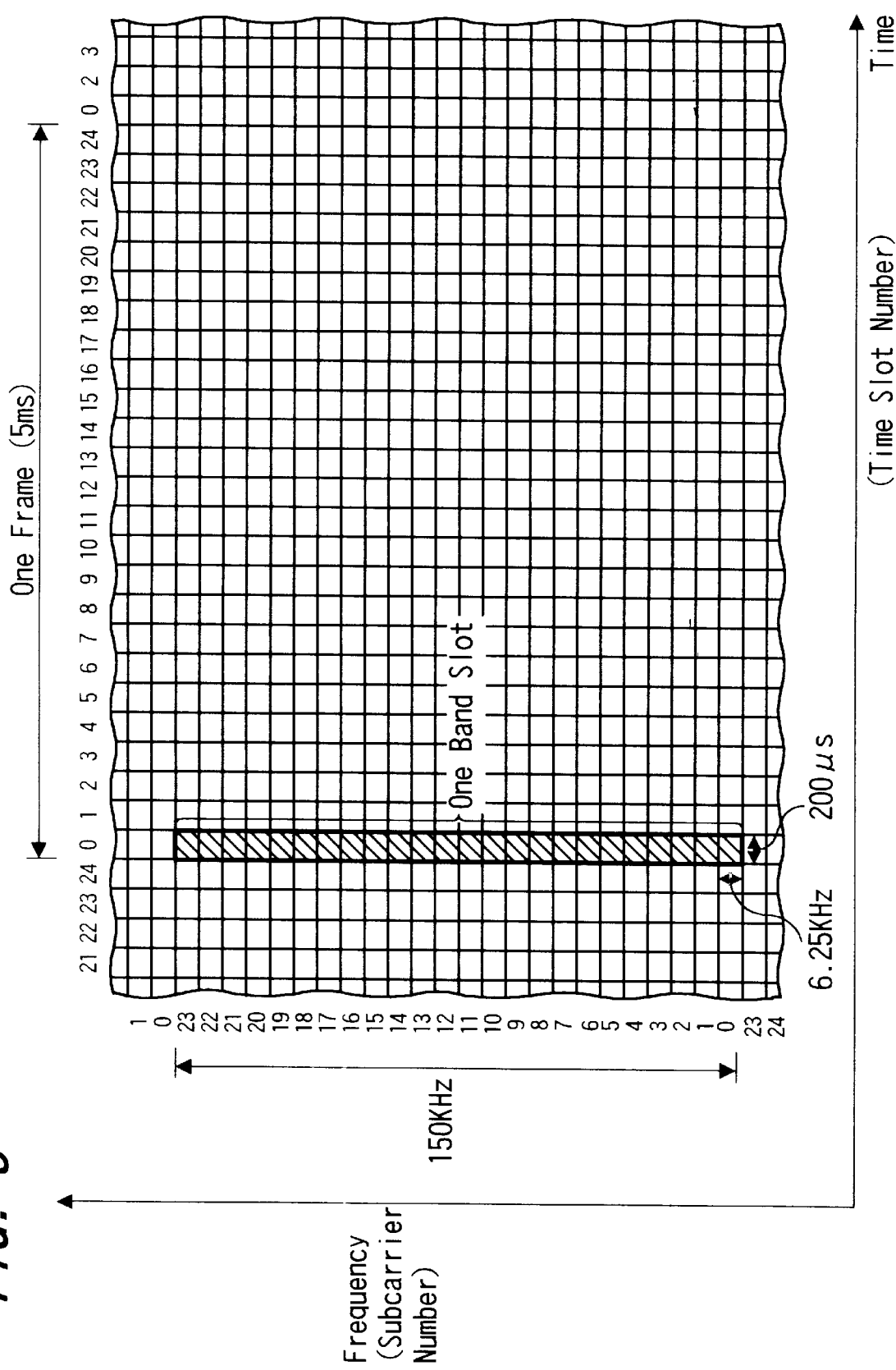
FIG. 3 is a diagram used to explain a slot arrangement of a transmission signal according to the embodiment of a present invention.
Figure 4:
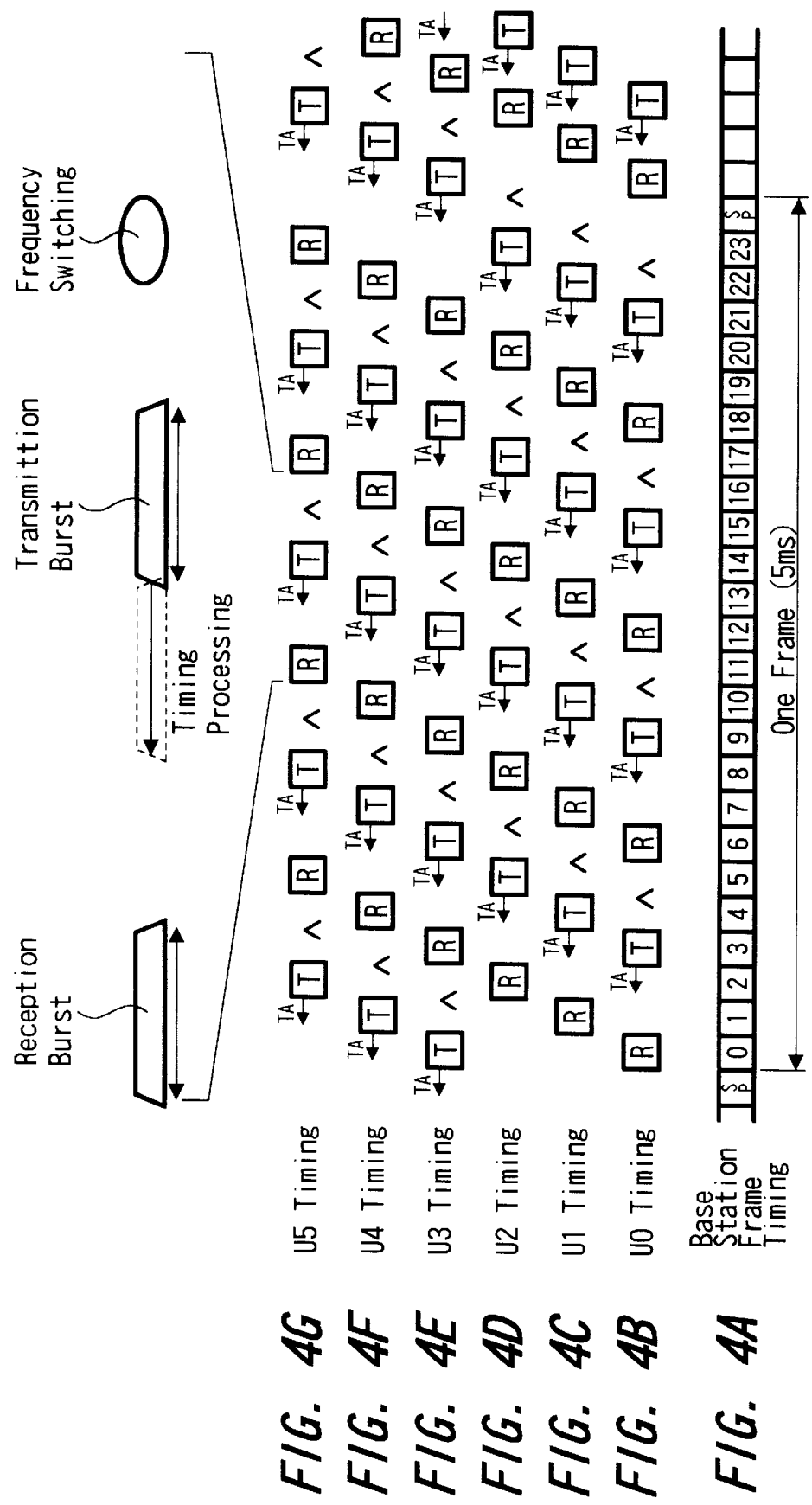
FIGS. 4A to 4G are diagrams used to explain a transmission state in a frame according to the embodiment.

The arrangement thereof will be described below. FIG. 3 is a diagram showing a slot arrangement of transmission signals of the present embodiment in which a frequency is set in the ordinate thereof and a time is expressed on the abscissa thereof. In the present example, the frequency-axis and the time-axis are divided in a lattice fashion to provide an orthogonal base system. That is, the transmission band width of one transmission band (one band slot) is set to 150 KHz and the one transmission band of the 150 KHz includes therein 24 subcarriers. The 24 subcarriers are disposed continuously with an equal interval of 6.25 KHz, and every carrier is assigned with a subcarrier number from 0 to 23. However, practically existing subcarriers are allocated to bands of subcarrier numbers of 1 to 22. Bands of both end portions of the one band slot, i.e., bands of subcarrier numbers of 0 and 23 are assigned with no subcarrier, i.e., they are made to serve as a guard band and their electric power is set to zero.

One time slot is regulated at an interval of 200 μsec. in terms of the time-axis. A burst signal is modulated and transmitted together with 22 subcarriers at every time slot. One frame is defined as an array of 25 time slots (i.e., 5 msec.). Each of the time slots within one frame is assigned with a time slot number from 0 to 24. A hatched area in FIG. 3 represents a section of one time slot in one band slot. In this case, a time slot assigned with a slot number of 24 is a period in which no data is transmitted.

Multiple access in which a plurality of mobile stations (terminal apparatus) carry out communication with a base station at the same period, is carried out by using the orthogonal base system which derives from dividing the frequency-axis and time-axis in a lattice fashion. Connection condition with respective mobile stations is arranged as shown in FIGS. 4A to 4G. FIGS. 4A to 4G are diagrams each showing an operation condition indicating how six mobile stations are connected to the base station by using time slots U0, U1, U2, . . . , U5 with one band slot (actually utilized band slot is changed owing to a frequency hopping which will be described later). A time slot represented by R is a reception slot while a time slot represented by T is a transmission slot. As shown in FIG. 4A, a frame timing regulated in the base station is set to a period including 24 time slots (of the 25 time slots, the last slot i.e, a slot of number 24 is not utilized). In this case, the transmission slot is transmitted using a band different from one of the reception slot.

The mobile station U0 shown in FIG. 4B uses time slots of time slot numbers, 0, 6, 12, 18 within one frame as a reception slot, while time slots of time slot numbers, 3, 9, 15, 21 as a transmission slot. A burst signal is received or transmitted in each time slot. The mobile station U1 shown in FIG. 4C uses time slots of time slot numbers, 1, 7, 13, 19 within one frame as a reception slot, while time slots of time slot numbers, 4, 10, 16, 22 as a transmission slot. The mobile station U2 shown in FIG. 4D uses time slots of time slot numbers, 2, 8, 14, 20 within one frame as a reception slot, while time slots of time slot numbers, 5, 11, 17, 23 as a transmission slot. The mobile station U3 shown in FIG. 4E uses time slots of time slot numbers, 3, 9, 15, 21 within one frame as a reception slot, while time slots of time slot numbers, 0, 6, 12, 28 as a transmission slot. The mobile station U4 shown in FIG. 4F uses time slots of time slot numbers, 4, 10, 16, 22 within one frame as a reception slot, while time slots of time slot numbers, 1, 7, 13, 22 as a transmission slot. Further, the mobile station U5 shown in FIG. 4G uses time slots of time slot numbers, 5, 11, 16, 22 within one frame as a reception slot, while time slots of time slot numbers, 2, 8, 14, 20 as a transmission slot.

In this way, 6-TDMA (time division multiple access) in which six mobile stations are connected within one band slot is carried out. Each mobile station has an allowance of two time slot periods (i.e., 400 μsec.) from completion of reception and transmission of one time slot period to the next execution of transmission and reception. Each mobile station carries out a timing processing and a processing called a frequency hopping by using the allowance. That is, during about 200 μsec. before each transmission slot T, the mobile station carries out a timing processing TA in which a transmission timing is synchronized with a timing of a signal transmitted from the base station side. After about 200 μsec. when each transmission slot T terminates, a frequency hopping in which a band slot for carrying out signal transmission and reception is changed to another band slot, is carried out. Owing to the frequency hopping, a plurality of band slots prepared in one base station are utilized uniformly by respective mobile stations, for example.

Specifically, a plurality of band slots are allocated to a single base station. In a case of a cellular system in which one base station forms one cell, if a band of 1.2 MHz is allocated to one cell, eight band slots can be allocated to one cell. Similarly, if a band of 2.4 MHz is allocated to one cell, 16 band slots can be allocated to one cell; if a band of 4.8 MHz is allocated to one cell, 32 band slots can be allocated to one cell; and if a band of 9.6 MHz is allocated to one cell, 64 band slots can be allocated to one cell. Then, a frequency switching processing called the frequency hopping is carried out so that a plurality of band slots allocated to one cell are utilized uniformly. In the present example, a plurality of band slots of which frequencies are continuous are allocated to one cell.

Figure 5:
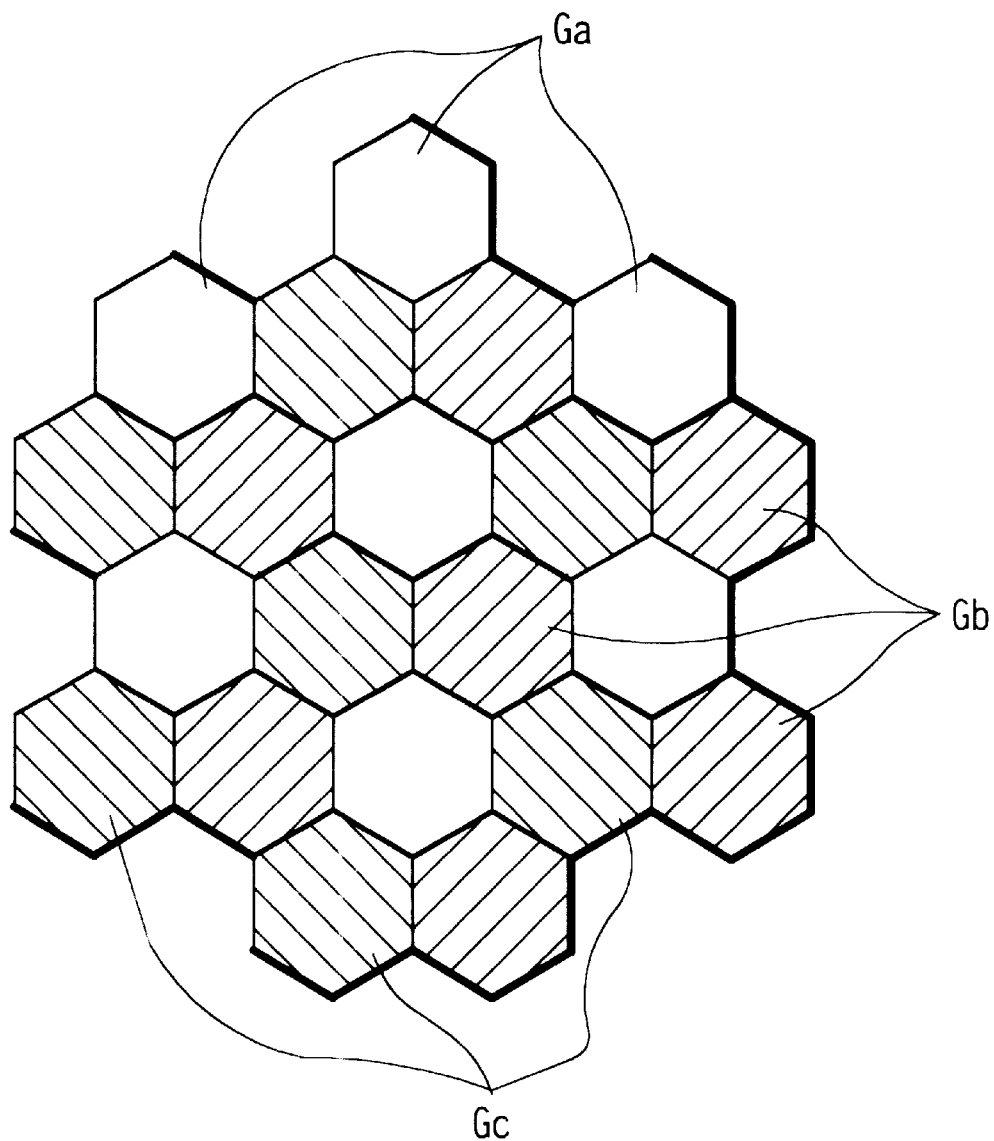
FIG. 5 is a diagram used to explain an example of a cell arrangement according to the embodiment.
Figures 6A, 6B, 6C:
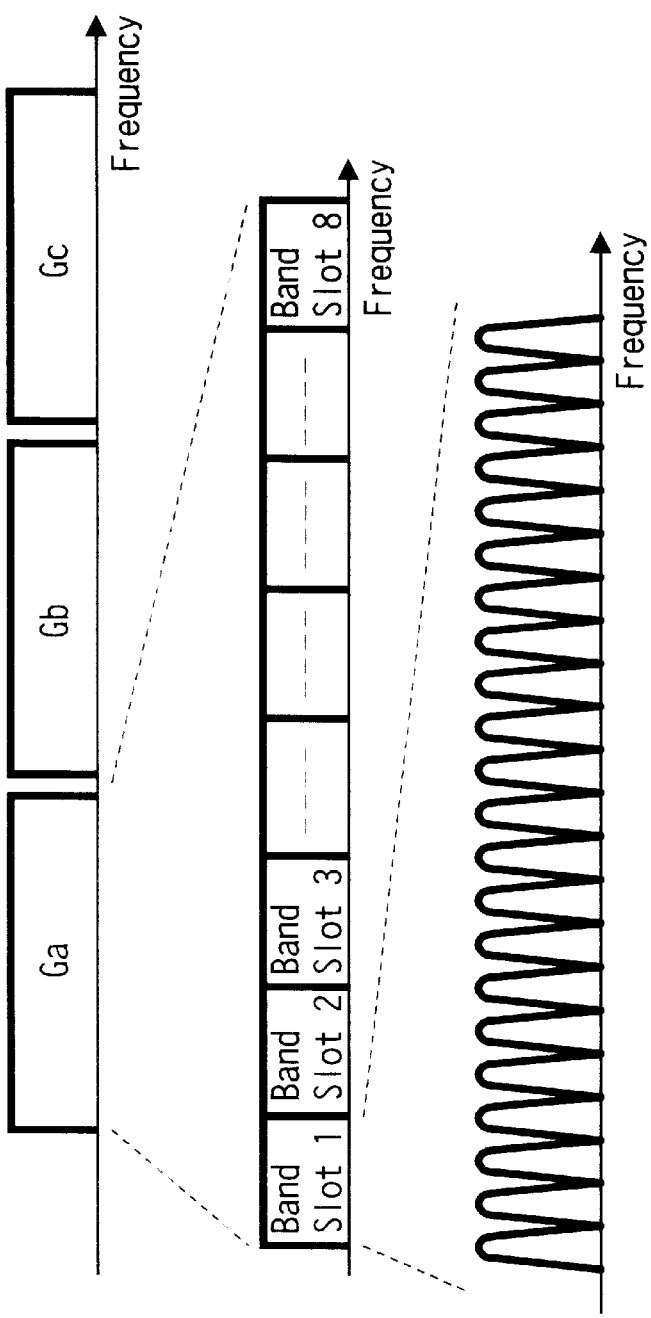
FIGS. 6A to 6C are diagrams used to explain an example of a band slot arrangement according to the embodiment.

FIG. 5 shows an ideal layout of cells. If cells are arrayed in this manner, three kinds of frequencies are sufficient to allocate all cells, i.e., a frequency is allocated to cells of a group Ga using a first band, another frequency is allocated to cells of a group Gb using a second band, still another frequency is allocated to cells of a group Gc using a third band. That is, if one cell uses eight band slots, as shown at in FIGS. 6A and 6B, continuous eight band slots are prepared for the group Ga, the next continuous eight band slots are prepared for the group Gb and the next continuous eight band slots are prepared for the group Gc. In this case, as shown at FIG. 6C, each band slot includes 22 subcarriers, and a multicarrier transmission is carried out using the plurality of subcarriers at a time. As shown in FIGS. 4A TO 4G, communication with a mobile station within the cell is carried out while carrying out the frequency hopping that band slots for multicarrier transmission are changed.

The communication condition is settled as above so that a signal transmitted between each mobile station and the base station is maintained to have orthogonal property with respect to other signals. Therefore, the signal will not suffer from interference from other signals and only a corresponding signal can be extracted satisfactorily. Since a band slot utilized for transmission is changed at any time by the frequency hopping, the transmission bands prepared for each base station are effectively utilized, which leads to effective transmission. In this case, as described above, a frequency band to be allocated to one base station (cell) can be freely settled. Therefore, a system can be freely settled depending on the particular situation.

Next, an arrangement of a terminal apparatus (mobile station) which carries out communication with the base station in the above-described system will be described. In this case, a band of 2.0 GHz is utilized as a down-link from the base station to the terminal apparatus while a band of 2.2 GHz is utilized as an up-link from the terminal apparatus to the base station.

Figure 7:
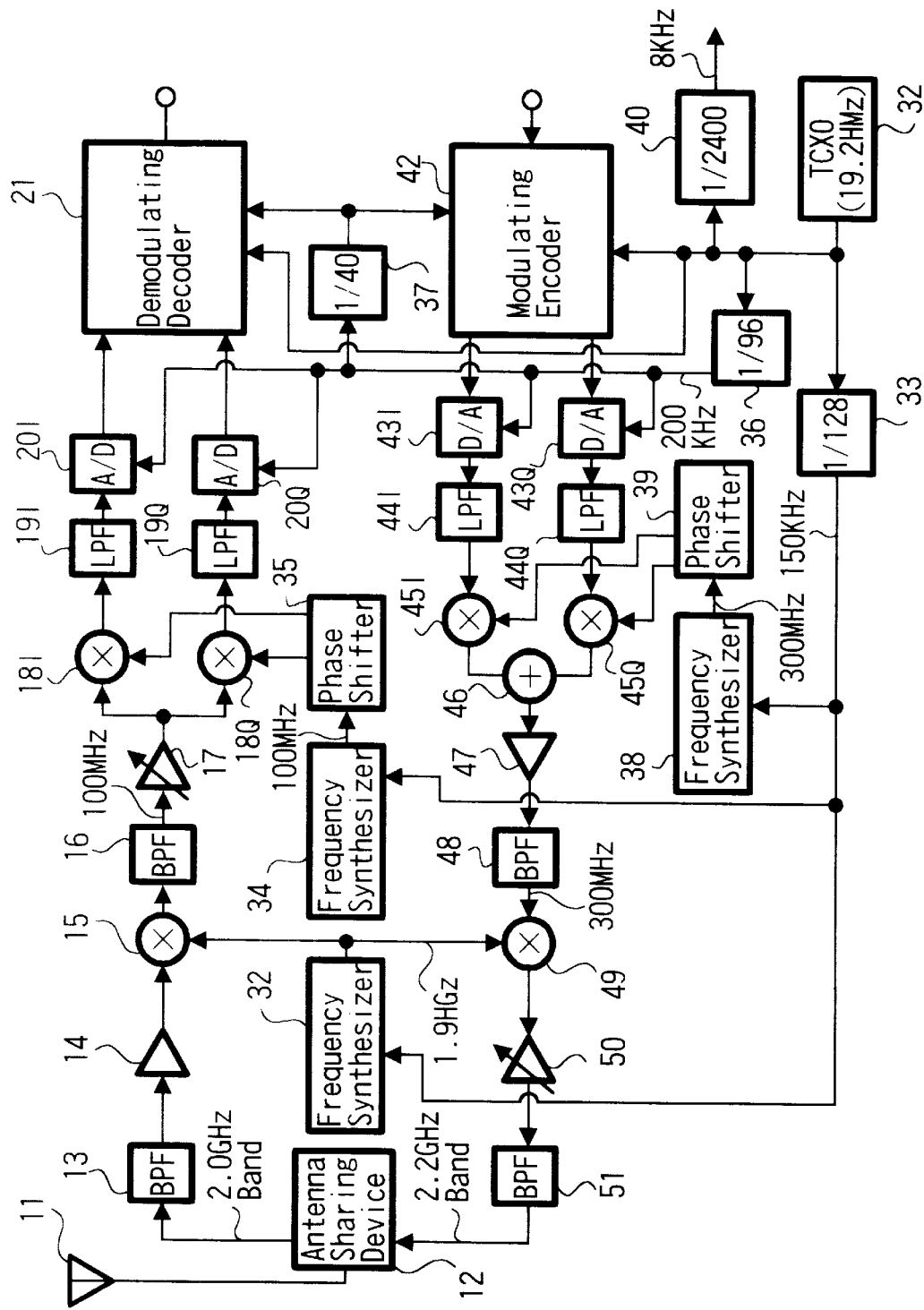
FIG. 7 is a block diagram showing an arrangement of a terminal apparatus according to the embodiment of the present invention.

FIG. 7 is a diagram showing an arrangement of the terminal apparatus. A reception system thereof will be described first. An antenna 11 serving for transmitting and receiving a signal is connected to an antenna sharing device. The antenna sharing device 12 is connected at its received signal output side with a band-pass filter 13, a reception amplifier 14 and a mixer 15 in series. The band-pass filter 13 extracts a signal of the 2.0 GHz band. The mixer 15 mixes the output from the band-pass filter with a frequency signal of 1.9 GHz output from a frequency synthesizer 31 so that the received signal is converted into an intermediate frequency signal of 100 MHz. The frequency synthesizer 31 is formed of a PLL (phase-locked-loop circuit), and it is a synthesizer for generating signals in a band of 1.9 GHz with an interval of 150 kHz (i.e., one band slot interval) based on a signal of 150 kHz which is generated by frequency-dividing a signal of 19.2 kHz output from a temperature compensation type crystal oscillator (TCXO) 32 by a 1/128 frequency divider 33. Other frequency synthesizers, which will be described later on, utilized in the terminal apparatus are also formed of a PLL circuit.

The intermediate frequency signal output from the mixer 15 is supplied through a band-pass filter 16 and a variable gain amplifier 17 to two mixers 18I, 18Q useful for demodulation. A frequency signal of 100 MHz output from a frequency synthesizer 34 is supplied to a phase shifter 35 in which the signal is made into two system signals of which phases are shifted from each other by 90 degrees. One of the two-system frequency signals is supplied to the mixer 18I while the other of the same is supplied to the mixer 18Q so that they are mixed with the intermediate frequency signal respectively, whereby an I component and a Q component contained in the received data are extracted. The frequency synthesizer 34 is a synthesizer for generating a signal of 100 MHz band based on the signal of 150 kHz generated by frequency-dividing of the 1/128 frequency-divider 33.

Then, the extracted I-component is supplied through a low-pass filter 19I to an analog-to-digital converter 20I in which the component is converted into digital I data. The extracted Q-component is supplied through a low-pass filter 19Q to an analog-to-digital converter 20Q in which the component is converted into digital Q data. In this case, the respective analog-to-digital converters 20I, 20Q use a clock of 200 kHz as a clock for conversion which is generated by dividing a clock of 19.2 MHz output from the TCXO 32 by a 1/96 frequency divider 36.

Then, the digital I data and digital Q data output from the analog-to-digital converters 20I, 20Q are supplied to a demodulating decoder 21 in which demodulated reception data is obtained at a terminal 22. The demodulating decoder 21 is supplied with the clock of 19.2 MHz output from the TCXO 32 as a clock as it is, and also supplied with a clock of 5 kHz generated by frequency-dividing the clock of 200 kHz output from the 1/96 frequency divider 36 by a 1/40 frequency-divider 37. The clock of 5 kHz is utilized for generating slot timing data. Specifically, in the present example, one time slot is set to 200 μsec. as described above. However, a signal of which frequency is 5 kHz has one period of 200 μsec. Thus, slot timing data is generated in synchronism with the signal of 5 kHz.

Next, the transmission system of the terminal apparatus will be described. Transmission data obtained at a terminal 41 is supplied to a modulating encoder 42 in which processing for encoding and modulation is carried out for transmission so as to generate digital I data and digital Q data for transmission. In this case, the modulating encoder 42 is supplied with the clock of 19.2 MHz as a clock which is output from the TCXO 32 as it is, and also supplied with the signal of 5 kHz generated by division with the 1/40 frequency-divider 37 as data for generating a slot timing. The digital I data and the digital Q data output from the modulating encoder 42 are supplied to digital-to-analog converters 43I and 43Q in which the data are converted into an analog I signal and an analog Q signal. The converted I signal and Q signal are supplied through low-pass filters 44I and 44Q to mixers 45I and 45Q. Further, a frequency signal of 300 MHz output from a frequency synthesizer 38 is converted by a phase shifter 39 into two system signals of which phases are shifted from each other by 90 degrees. One of the two system frequency signals is supplied to the mixer 45I while the other of the same is supplied to the mixer 45Q, whereby the frequency signals are mixed with the I signal and the Q signal, respectively, so as to form signals falling in a 300 MHz band. Both of the signals are supplied to an adder 46 in which is carried out an orthogonal modulation to unify them into a single system signal. The frequency synthesizer 38 is a synthesizer for generating a signal of 300 MHz band based on the signal of 150 kHz generated by a frequency-division with the 1/128 frequency-divider 33.

Then, the signal modulated into the signal of 300 MHz band output from the adder 46 is supplied through a transmission amplifier 47 and a band-pass filter 48 to a mixer 49, in which the signal is added with a frequency signal of 1.9 GHz output from the frequency synthesizer 31 so as to convert the signal into a signal of a transmission frequency of 2.2 GHz band. The transmission signal frequency-converted into the transmission frequency is supplied through a transmission amplifier (variable gain amplifier) 50 and a band-pass filter 51 to the antenna sharing device 12 so that the signal is transmitted from the antenna 11 connected to the antenna sharing device 12 in a wireless fashion. A gain of the transmission amplifier 50 is controlled to thereby adjust a transmission output. The control in transmission output is carried out based on output control data received from the base station side, for example.

Further, the signal of 19.2 MHz output from the TCXO 32 is supplied to a 1/2400 frequency-divider 40 to be converted into a signal of 8 kHz, and the signal of 8 kHz is supplied to a circuit of a speech processing system (not shown). That is, in the terminal apparatus of the present example, a speech signal transmitted between it and the base station is sampled at a rate of 8 kHz (or oversampling at a rate of an integral multiple of the frequency). Thus, the 1/2400 frequency divider 40 produces a clock necessary for speech data processing circuits such as an analog-to-digital converter and a digital-to-analog converter of a speech signal or a digital signal processor (DSP) for processing for compression and expansion on speech data and so on.

Figure 8:
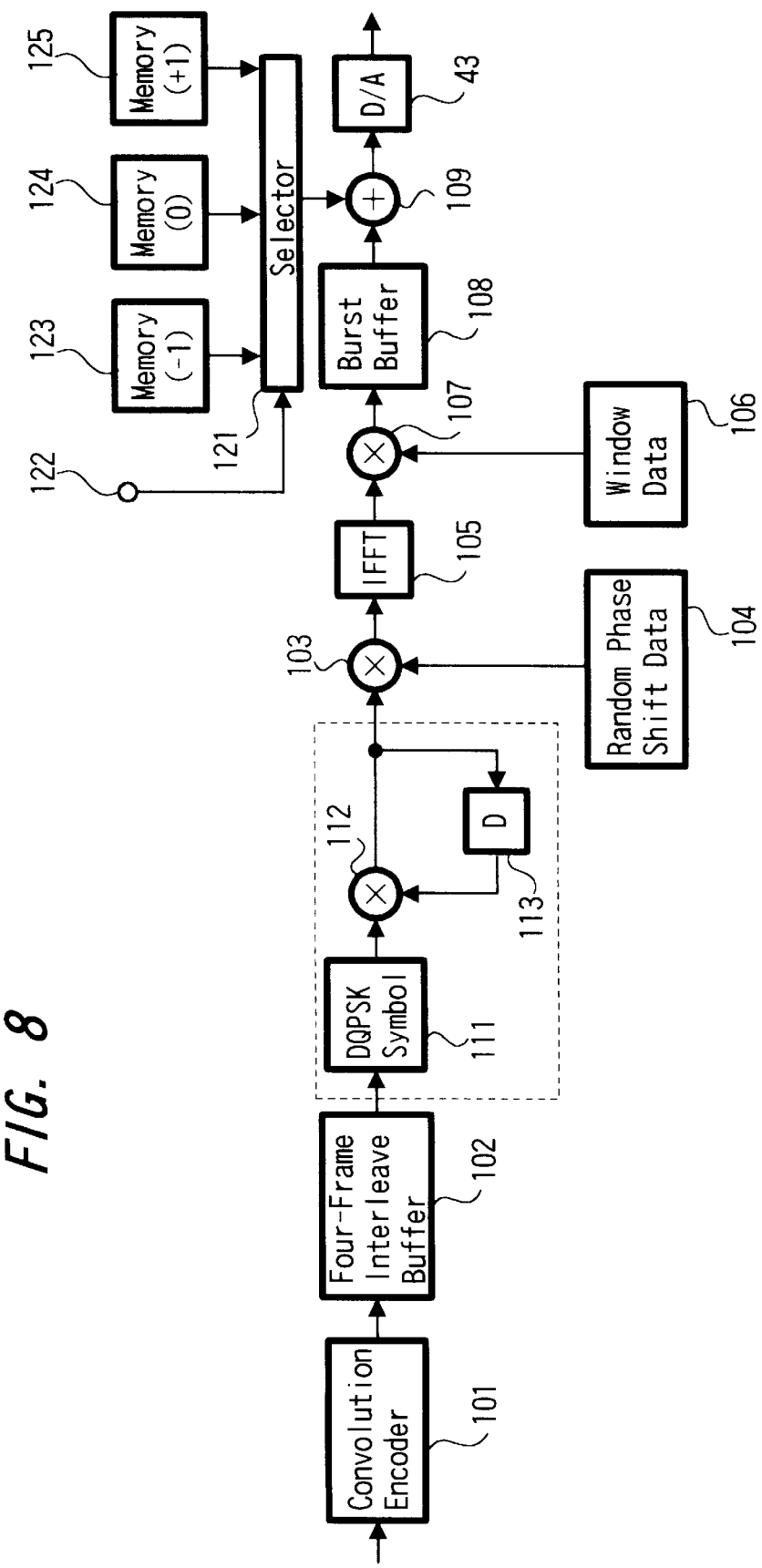
FIG. 8 is a block diagram showing an arrangement of an encoder of the terminal apparatus according to the embodiment.
Figure 9:
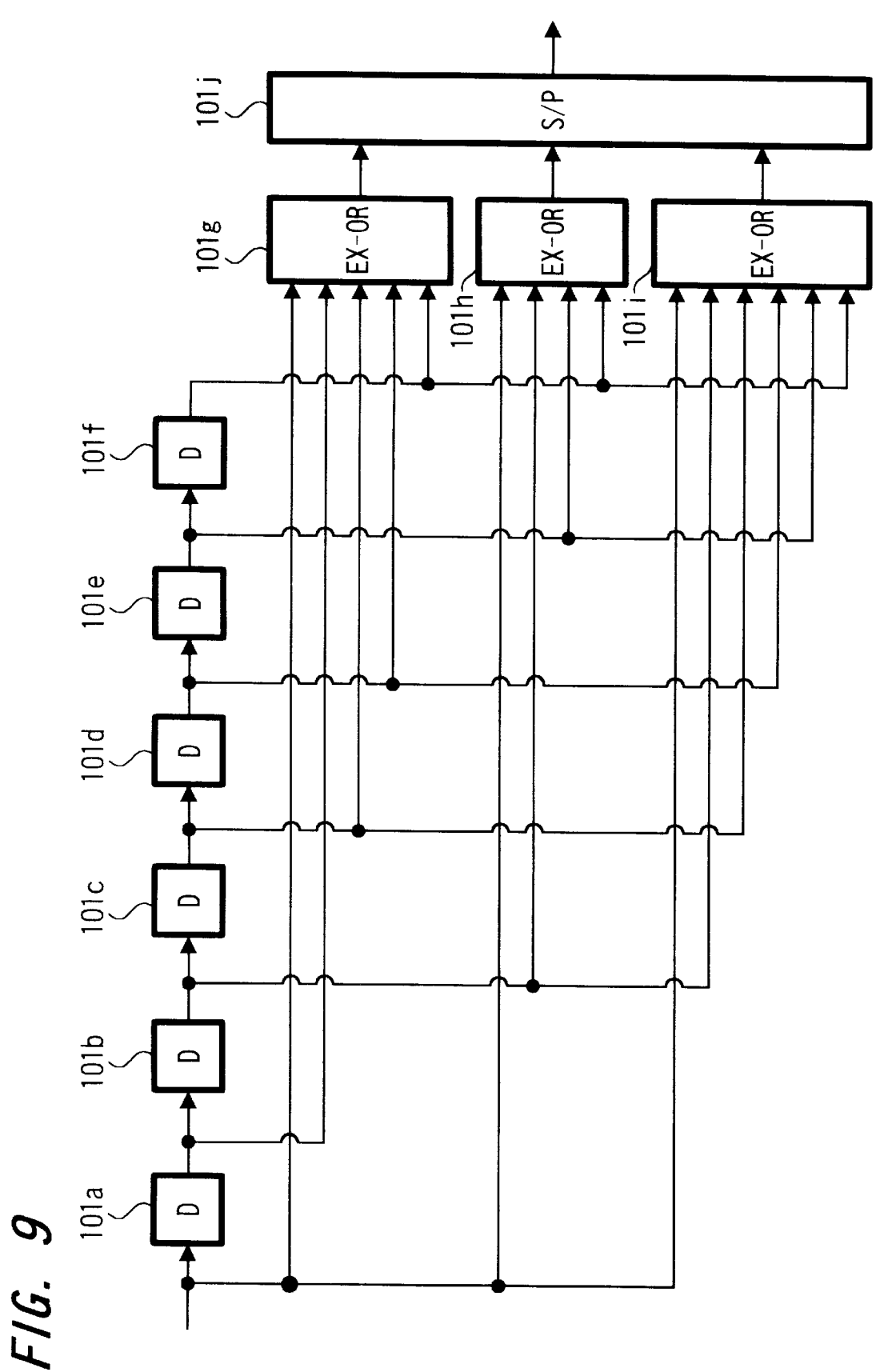
FIG. 9 is a block diagram showing an arrangement of a convolutional encoder of the terminal apparatus according to the embodiment.

Next, the encoder in the transmission system of the terminal apparatus of the arrangement and its peripheral arrangement will be described in detail with reference to FIG. 8. Transmission data is supplied to a convolution encoder 101 in which the data is subjected to convolution encoding. The convolution encoding is carried out with a constrained length of k=7 and a coding rate of R=1/3, for example. FIG. 9 is a diagram showing an arrangement of the convolution encoder with a constrained length of k=7 and a coding rate of R=1/3. Input data is supplied to six delay circuits 101a, 101b, ..., 101f which are connected in series so that data of continuous 7 bits are made coincident in their timing. Ex-OR gate 101g, 101h, 101i take an exclusive-OR of a predetermined data of the seven bits and outputs of the respective Ex-OR gates 101g, 101h, 101i are converted into parallel data by a serial-to-parallel converting circuit 101j, whereby convolution-encoded data is obtained.

FIG. 8 is again described. An output of the convolution encoder 101 is supplied to a four-frame interleave buffer 102 in which data interleave is carried out over four frames (20 msec.). An output of the interleave buffer 102 is supplied to a DQPSK encoder 110 in which a DQPSK modulation is carried out. That is, a DQPSK symbol generating circuit 111 generates a corresponding symbol based on supplied data, and then the symbol is supplied to a multiplier 112 at one input terminal thereof. A delay circuit 113 delays a multiplied output of the multiplier 112 by one symbol amount and returns it to the other input terminal thereof, whereby the DQPSK modulation is carried out. The DQPSK modulated data is supplied to a multiplier 103 so that random phase shift data output from a random phase shift data generating circuit 104 is multiplied with the modulated data, whereby phase of the data is apparently changed at random.

An output of the multiplier 103 is supplied to an IFFT circuit (inverse fast Fourier transformation circuit) 105 in which a conversion processing to the time-axis is carried out on the data of the frequency-axis by a calculation of the fast Fourier inverse transformation, whereby data on the read time-axis of the multicarrier signal of 22 subcarriers with an interval of 6.25 kHz is produced. The IFFT circuit for carrying out the fast Fourier inverse transformation enables an arrangement for generating subcarriers of a second power number relatively easily. The IFFT circuit 105 employed in the present example is capable of generating $2^5$ subcarriers, i.e., 32 subcarriers and outputs data modulated into continuous 22 subcarriers of the generated subcarriers. The modulation rate of transmission data dealt with by the FFT circuit 105 of the present example is set to 200 kHz. A signal of a modulation rate of 200 kHz is converted into 32 multicarriers to produce multicarrier signals with an interval of 6.25 kHz, which numeral derives from calculation of 200 kHz÷32=6.25 kHz.

Figures 10A, 10B:
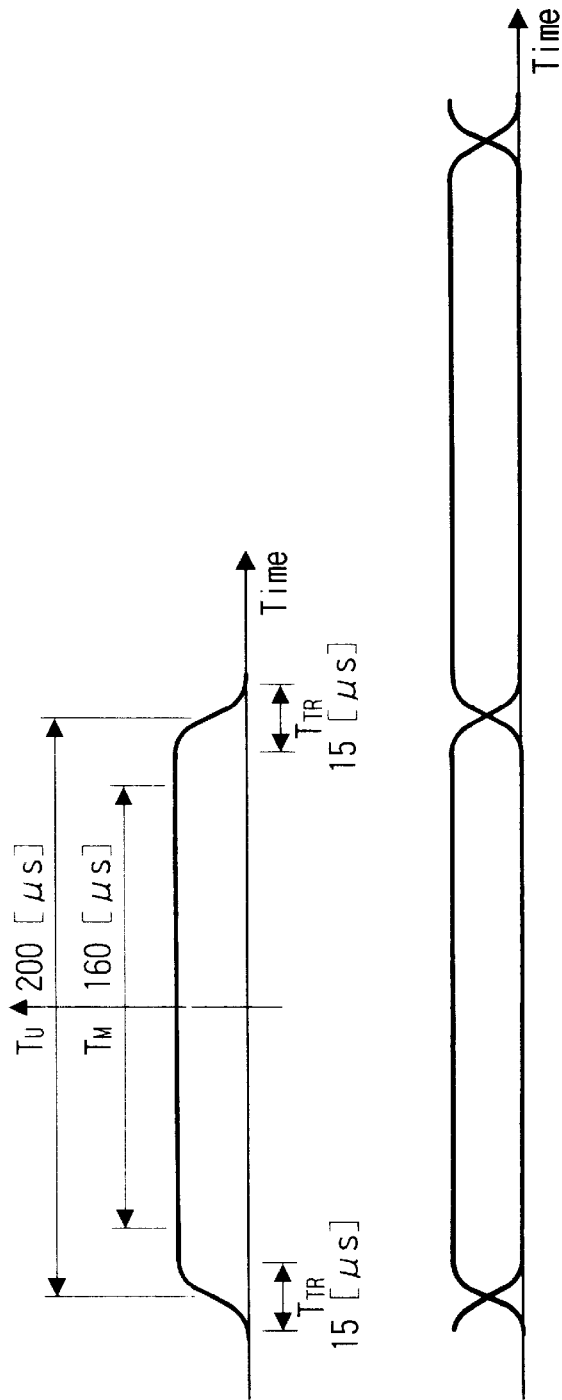
FIGS. 10A and 10B are waveform diagrams showing an example of a windowing data according to the embodiment.

The multicarrier data transformed into data of the real time by the fast Fourier inverse transformation are supplied to a multiplier 107 in which the data is multiplied with a time waveform output from a windowing data generating circuit 106. The time waveform is a waveform having one waveform length $T_u$, or about 200 $\mu$sec. (that is, one time slot period) as shown in FIG. 10A, for example, on the transmission side. However, the waveform is arranged to have its both end portions $T_{TR}$ (about 15 $\mu$sec.) changing gently in its waveform level. Hence, the neighboring time waveforms are arranged to overlap partly on each other as shown in FIG. 10B when the time waveform is utilized for multiplication.

FIG. 8 is again described. The signal multiplied with the time waveform by the multiplier 107 is supplied through a burst buffer 108 to an adder 109. The adder 109 adds control data output from a control data selector 121 to the signal at a predetermined position. The control data utilized for addition is control data indicating control of transmission output. Based on a result of determination over the condition of the received signal at a terminal 122, the selector 121 sets the control data. An arrangement for obtaining data derived from determination over the received signal condition at the terminal 122 will be described later on.

In this case, the selector 121 is connected with three control data memories 123, 124, 125 (actually, these memories may be provided by dividing an area of one memory into three portions). Control data for decreasing a transmission output (−1 data) is stored in the memory 123, control data for keeping the transmission output in an unchanged state (±0 data) is stored in the memory 124, and control data for increasing the transmission output (+1 data) is stored in the memory 125, respectively. The control data stored in this case is data equivalent to data when the corresponding control data is subjected to the modulation processing for transmission in the encoder up to the multiplier 107.

Figure 11:
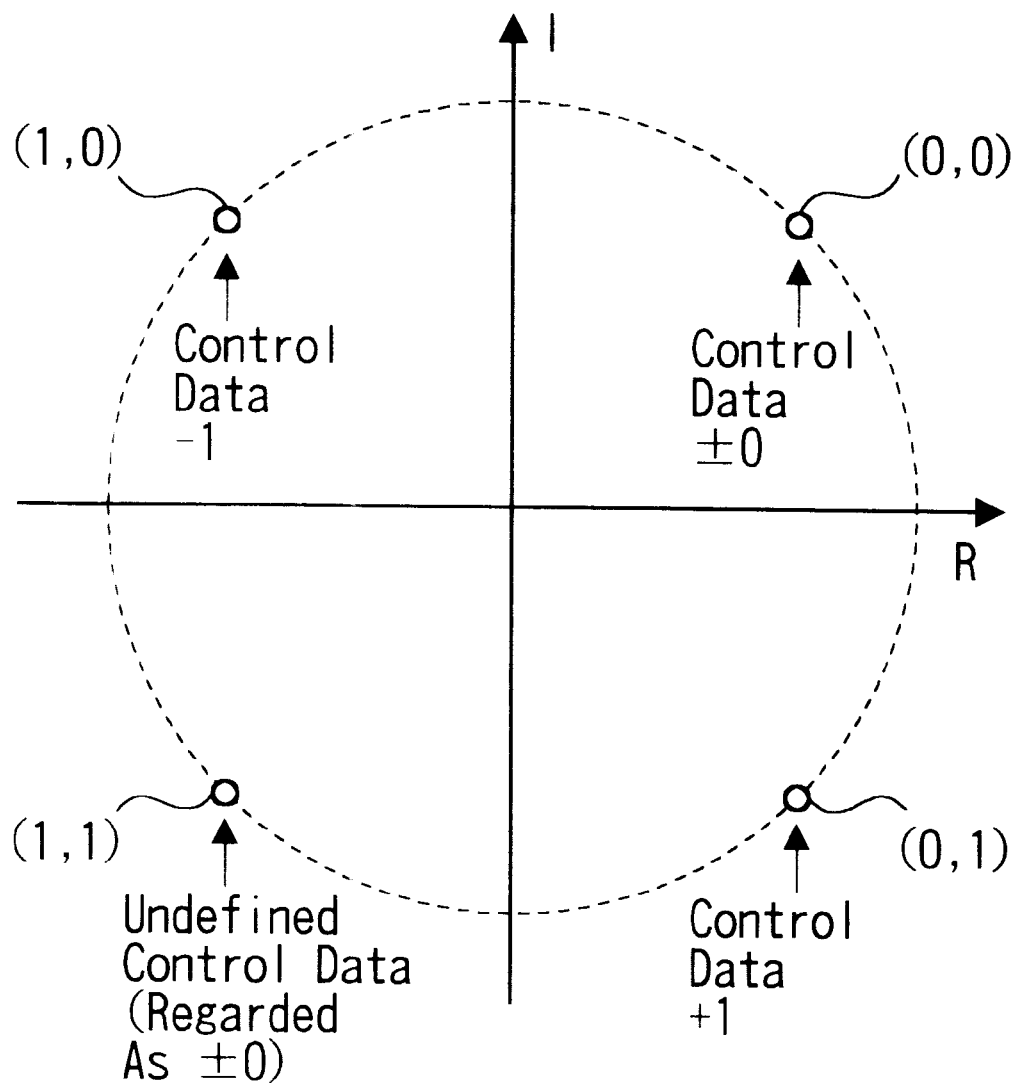
FIG. 11 is a phase characteristic graph showing an example of a transmission data according to the embodiment.

More concretely, the transmission data is a phase-modulated data changing on a plane formed by the I-axis and the Q-axis orthogonal to each other, i.e., the data changing along a circle on a plane shown in FIG. 11. Data (I, Q) at a position of (0, 0) is set to ±0 data, that at a position of (1, 0) behind from the position by 90 degrees is set to −1 data and that at a position of (0, 1) ahead of the position of ±0 data by 90 degrees is set to +1 data. Control data for the transmission output corresponding to a position of (1, 1) is undefined so that when the reception side discriminates the data of the position, the data is regarded as ±0 data to keep the transmission output unchanged. The signal phase shown in FIG. 11 is a phase before being modulated into multicarrier signals. Actually, the data of the signal phase is modulated into multicarrier signal and data generated by multiplied with a time waveform are stored in respective memories 123, 124, 125.

Transmission data added with the control data by the adder 109 is supplied to a digital-to-analog converter 43 (which corresponds to the digital-to-analog converters 43I, 43Q shown in FIG. 7) in which the transmission data is converted into an analog signal using a clock of 200 kHz for conversion.

Figure 12:
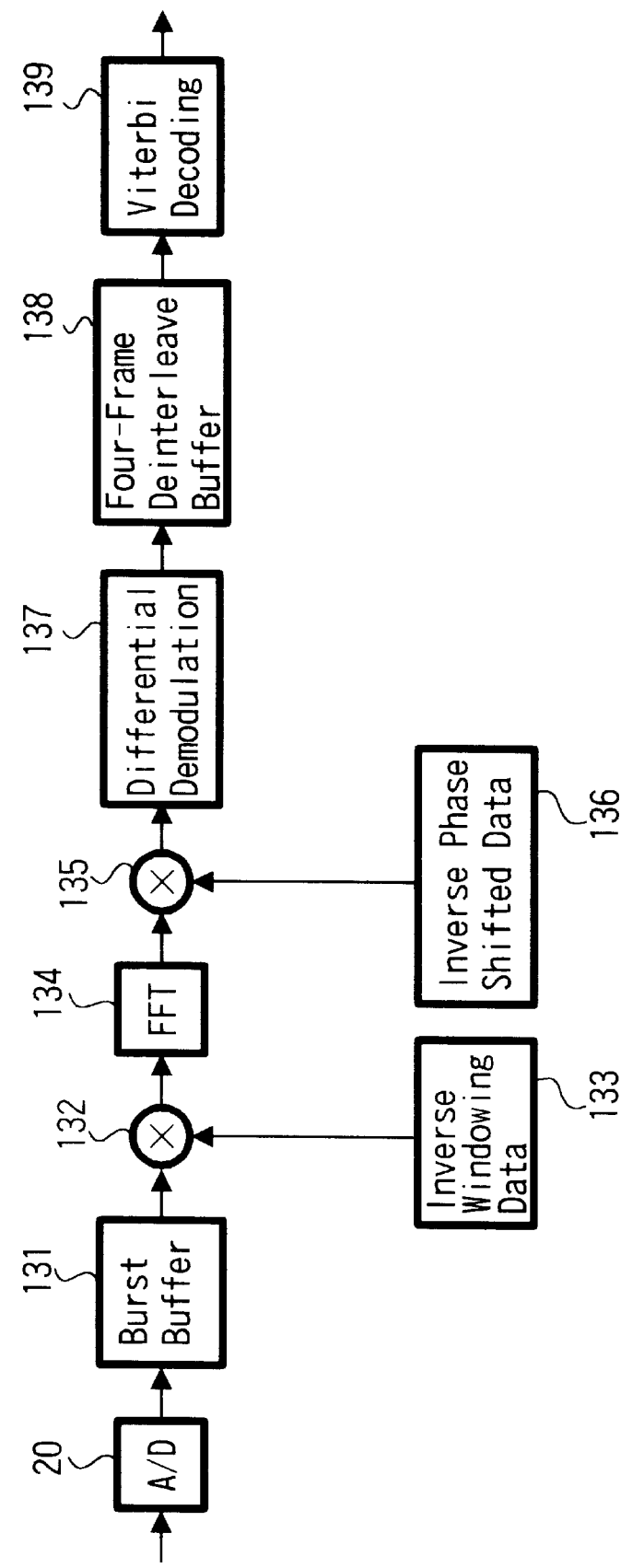
FIG. 12 is a block diagram showing an arrangement of a decoder of the terminal apparatus according to the embodiment.

Next, the decoder and the peripheral arrangement thereof of the reception system of the terminal apparatus of the present example will be described in detail with reference to FIG. 12. Digital data resulting from conversion by an analog-to-digital converter 20 (corresponding to the analog-to-digital converters 20I, 20Q in FIG. 7) using a clock of 200 kHz, is supplied through a burst buffer 131 to a multiplier 132, in which the digital data is multiplied with a time waveform output from an inverse windowing data generating circuit 133. The time waveform utilized for multiplication upon reception is a time waveform with a shape shown at FIG. 10A. This time waveform is arranged to have a length, $T_M$, i.e., 160 μsec. which is shorter than the length of the same upon transmission.

The reception data multiplied with the time waveform is supplied to a FFT circuit 134 in which conversion between a frequency axis and a timebase is carried out by the fast Fourier transformation processing, whereby the transmitted data modulated into 22 subcarriers with an interval of 6.25 kHz and arranged on the time base are separated into an information component which each carrier has. The conversion processing in this case is carried out by a circuit capable of processing $2^5$ subcarriers, i.e., 32 subcarriers, similarly to the case in which conversion processing is carried out by the IFFT circuit in the transmission system. Data modulated into continuous 22 subcarriers of them are converted and output therefrom. The modulation rate of transmission data dealt by the FFT circuit 134 of the present example is set to 200 kHz. Since the circuit is capable of processing 32 multicarriers, conversion processing can be carried out on multicarriers with an interval of 6.25 kHz, which numeral derives from calculation of 200 kHz÷32=6.25 kHz.

The reception data which has been subjected to by the fast Fourier transformation in the FFT circuit 134 is supplied to a multiplier 135, in which the reception data is multiplied with inverse random phase shift data (this data is data changing in synchronism with random phase shift data on the transmission side) output from an inverse random phase shift data generating circuit 136, whereby the data is restored to its original phase.

The data restored to its original phase is supplied to a differential demodulation circuit 137 in which the data is subjected to differential demodulation. The differentially demodulated data is supplied to a four-frame deinterleave buffer 138 in which data interleaved over four frames upon transmission is restored to its original data order. The deinterleaved data is supplied to a Viterbi decoder 139 in which the data is Viterbi-decoded. The Viterbi-decoded data is supplied as decoded reception data to a reception data processing circuit (not shown) placed in the later stage.

Figure 13:
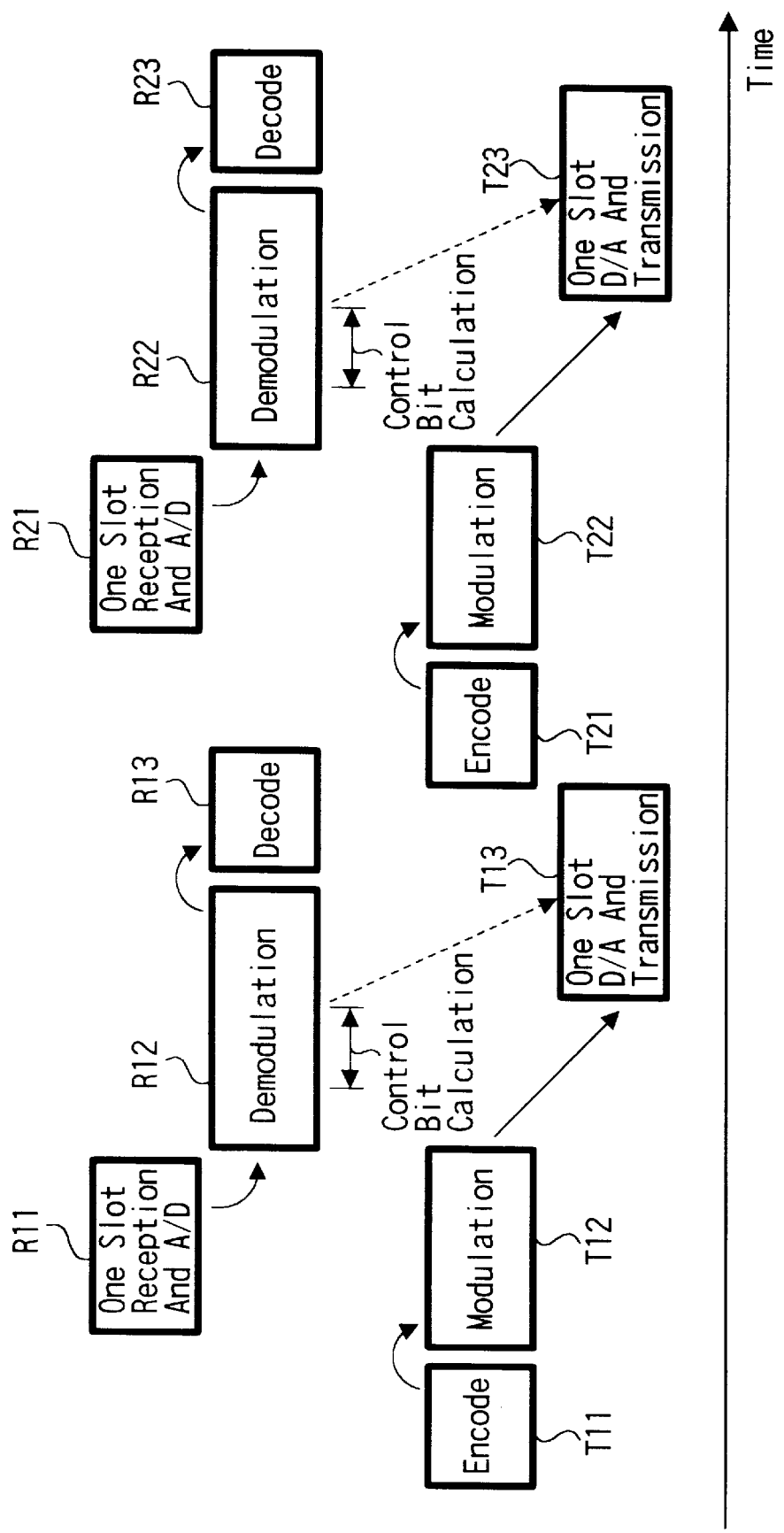
FIG. 13 is a timing chart showing a processing timing according to the embodiment.

FIG. 13 shows timings of processings described so far. Initially, data of one time slot is received at timing R11 in the reception system, and simultaneously with the reception, the received data is converted into digital data by the analog-to-digital converter 20 and then stored in the burst buffer 131. The stored reception data is subjected to demodulation processings such as multiplication with the time waveform, the fast Fourier transform, multiplication with the inverse random phase shift data, differential demodulation, Viterbi demodulation and so on at the next timing R12. Thereafter, decoding is carried out by data processing at the next timing R13.

Then, from timing R21 which is six time slots after timing R11, to timing R23, a processing the same as that of timing R11 to R13 is carried out. Thereafter, the same processing is repeated.

In the transmission system, transmission is carried out at a timing shifted by three time slots with respect to the timing of reception. That is, the transmission data is encoded at predetermined timing T11, the encoded data is subjected to a modulation processing by which the data is converted into transmission data of one burst amount at the next timing T12, and the data is once stored in the burst buffer 108 of the transmission system. Then, at timing T13 behind three time slots from the reception timing R11, the transmission data stored in the burst buffer 108 is converted by the digital-to-analog converter 43 and then subjected to transmission processing and transmitted from the antenna 11. Then, from timing T21, which is six time slots after timing Y11, to timing T23 a processing the same as that of timing T11 to T13 is carried out. Thereafter, the same processing is repeated.

In this way, reception processing and transmission processing are carried out intermittently in a time sharing manner. In the present example, control data (control bit) of the transmission output to be added to transmission data is, i.e., the control data of the transmission output upon transmission as described with reference to FIG. 8, is added by the adder 109 at the last timing when the encode processing is completed for transmission. Therefore, the state of the reception data can be swiftly reflected upon the control data to be transmitted. That is, for example, reception state of the burst signal received at timing R11 is detected at a midst of demodulation at timing R12, and the control state of the transmission output to be notified to the opponent of communication (base station) is determined (i.e., a processing at timing noted as control bit calculation in FIG. 13 is carried out, and it will be described in detail later on). When the control bit is calculated, the result of calculation is sent from the terminal 122 to the selector 121, in which the calculation result is added with control data corresponding to transmission data stored in the burst buffer 108, and a burst signal to be transmitted at timing T13 is added with control data of transmission output based on the last received data indicative of the state.

The opponent carrying out communication (base station) determines the control data transmitted at timing T13 so that the opponent controls the transmission output into the corresponding state when the burst signal is transmitted from the base station at the next timing R21. Consequently, the burst signal to be transmitted next is controlled in its transmission output on the basis of the reception state of the burst signal which has been transmitted in the preceding cycle. Thus, the transmission output is positively controlled at every one cycle when the burst signal is transmitted, and hence it is possible to substantially uniform transmission outputs of transmission signals transmitted through a plurality of paths between the terminal apparatus and one base station at the same time.

If it is not carried out, as in the present example, the control data of the transmission output is prepared in the memory in advance to carry out adding processing, then the following consequence will happen in the example of FIG. 13. That is, a result received at timing R11 is determined in the process of demodulation at timing R12, thereafter the control data is encoded at timing T21 and demodulated at timing T22, and the control data based on the reception result at timing R11 is transmitted in response to the burst signal transmitted at timing T23. Thus, it is impossible to control the transmission output at every cycle. While description has been made on a case in which the terminal apparatus side generates data useful for controlling the transmission output from the base station, it is needless to say that the base station side may also generate data useful for controlling the transmission output from the terminal apparatus.

Figure 14:
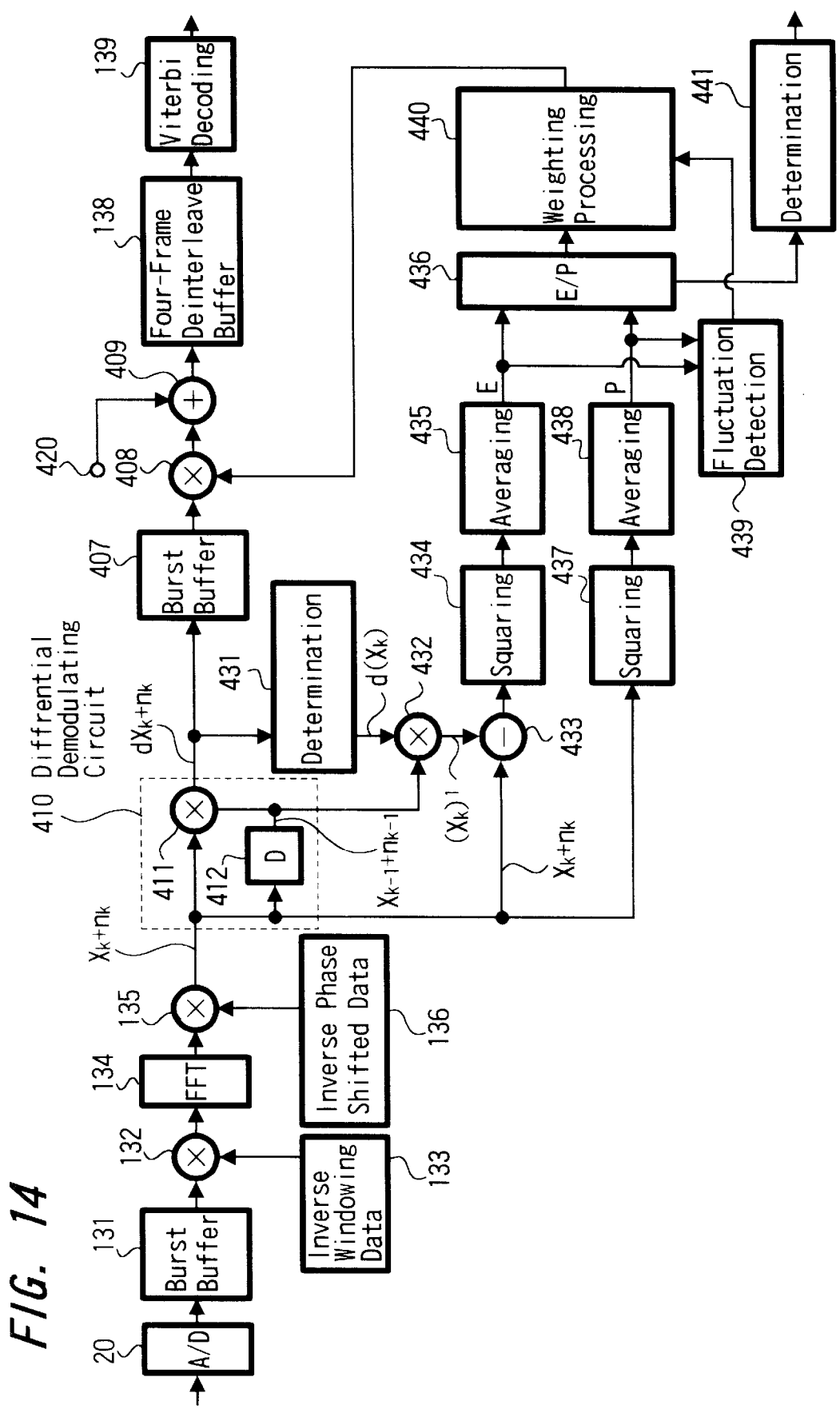
FIG. 14 is a block diagram showing a part for detecting a noise in a receiving processing according to the embodiment.

Next, description will be made on a processing for measuring the state of the transmission signal, i.e., a processing for calculating control bits useful for the above control. In this case, it is assumed that measurement is made by detecting a noise power of the transmission signal. FIG. 14 shows the arrangement thereof. In the arrangement shown in FIG. 14, an arrangement in which reception data digitized by the analog-to-digital converter 20 is multiplied with a time waveform, multicarrier signals are converted into data of symbol series by the FFT circuit 134, the data of symbol series are multiplied with inverse random phase shift data by the multiplier 135, and then the data is restored to have the original phase is same as the arrangement of the decoder described with reference to FIG. 12.

The reception data of the symbol series are supplied to a differential demodulating circuit 410 in which a multiplier 411 multiplies the data of the reception symbol series with the preceding reception data delayed by a delay circuit 412 by one symbol amount, whereby differential demodulation is carried out. The differentially demodulated data is supplied through a burst buffer 407 to a multiplier 408. The multiplier 408 is supplied with data of soft determination value of data Viterbi-decoded by a processing which will be described later. Thus, the data of the soft determination value is multiplied with the differentially demodulated data. An output of the multiplier 408 is supplied to an adder 409. If the receiving apparatus is a so-called diversity receiving apparatus in which a plurality of receiving systems are provided, another system (not shown) for carrying out a receiving processing identical to the processing described so far supplies a reception signal from a terminal 420 to the adder 409, in which the reception signals are synthesized to form reception data of a single system (therefore, if the receiving apparatus is not a diversity receiving apparatus, the adder 409 is unnecessary).

An output from the adder 409 is supplied to the four-frame deinterleave buffer 138 in which data interleaved over four frames upon transmission is restored to have its original data order. The deinterleaved data is supplied to the Viterbi decoder 139 in which the data is Viterbi-decoded.

An arrangement for detecting noise power is provided with a symbol determination circuit 431 which determines symbols demodulated by the differential demodulating circuit 410. Data of symbol series determined by the symbol determination circuit 431 is supplied to a differential modulation circuit 432. Then, data preceding by one symbol amount output from the delay circuit 412 within the differential demodulating circuit 410 is supplied to the differential modulating circuit 432, in which determined symbol series is again made into differentially modulated data with data preceding by one symbol amount.

The differentially modulated data is supplied to a subtracter 433. Further, the reception data output from the multiplier 135 is supplied to the subtracter 433, whereby difference between the data again subjected to the differential modulation and the reception data (symbol currently dealt) is detected by the subtracter 433. The difference detected by the subtracter 433 is regarded as noise caused in the transmission path. The detected difference data is supplied to a squaring circuit 434 by which an absolute value is obtained. An output of the squaring circuit 434 is supplied to an averaging circuit 435 to calculate the mean value of the data, and the resulting value is set to a noise power estimation value E. The calculated mean value (noise power estimation value E) is supplied to a ratio calculating circuit 436 and also supplied to a fluctuation detecting circuit 439.

Further, the reception data output from the multiplier 135 is supplied to a squaring circuit 437 by which an absolute value is obtained. An output of the squaring circuit 437 is supplied to an averaging circuit 438 to calculate the mean value of the data, and the resulting value is set to a power P of the reception symbol. The calculated mean value (the power P of the reception symbol) is supplied to the ratio calculating circuit 436 and also supplied to the fluctuation detecting circuit 439.

Figure 15:
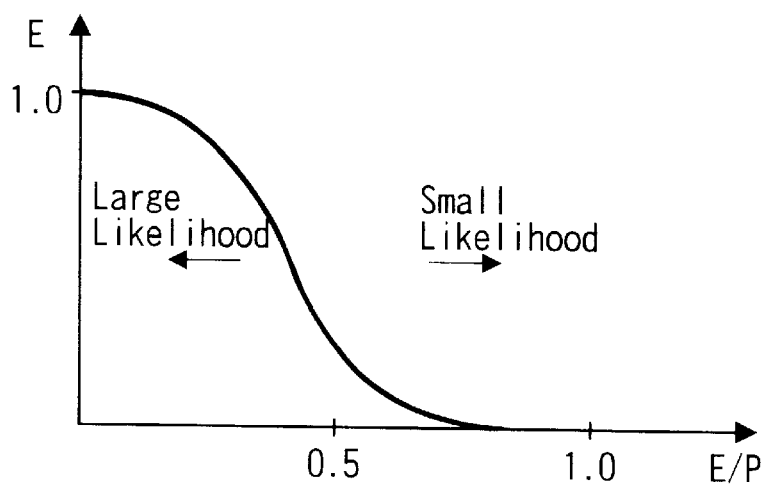
FIG. 15 is a characteristic graph showing how to carry out the weighting according to the embodiment.

The ratio calculating circuit 436 calculates ratio of supplied data, i.e., a ratio of [noise power estimation value E/power P of the received symbol] (hereinafter referred to as simply E/P). The calculated value of E/P is supplied to a weighting processing circuit 440 in which a predetermined weighting processing is carried out, whereby a value W which has been subjected to the weighting processing in the weighting processing circuit 440 is obtained. The weighted value W is utilized as a soft determination value for Viterbi-decoding the reception data, and the soft-determination value is supplied to the multiplier 408. FIG. 15 shows an example for carrying out the weighting processing. The weighted value W is regarded as a likelihood of the received symbol series. As shown in FIG. 15, the function of the a decreasing function in the right side direction is present when the weighted value W is taken as the longitudinal axis and the rate E/P as the lateral axis. This decreasing function in the right side direction can be defined by the following equation.

$$W = e^{-(E/P)^2} \tag{1}$$

Further, the value of E/P calculated by the ratio calculating circuit 436 is supplied to a noise power determining circuit 441 in which determination processing on noise power is carried out. The data resulting from the determination is supplied to the terminal 122 (see FIG. 8).

Figure 16:
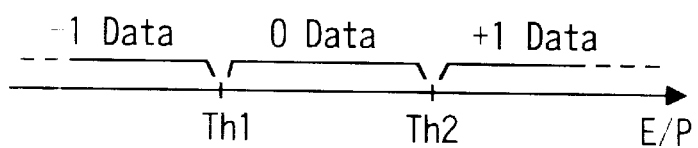
FIG. 16 is a diagram used to explain a generation state of control data according to the embodiment.

In this case, the determination processing in the noise power determining circuit 441 is carried out as shown in FIG. 16, for example. Specifically, if the value of E/P is equal to or smaller than a first threshold value Th1, then it is determined that the transmission power is excessive (i.e., the quality is too good). Thus, −1 data is generated to output control data that makes the opponent (base station) lower the transmission output. On the other hand, if the value of E/P is equal to or larger than a second threshold value Th2, then it is determined that the transmission power is insufficient (i.e., the quality is bad). Thus, +1 data is generated to output control data that increases the transmission output. Furthermore, if the value of E/P is placed between the first threshold value Th1 and the second threshold value Th2, then it is determined that the transmission power is proper. Thus, ±0 data is generated to output control data that maintains the transmission output.

While in this case processing is carried out with the first threshold value Th1 and the second threshold value Th2 provided, for example, the first threshold value Th1 and the second threshold value Th2 may be set to the same value so that control data of two values instructing lowering and increasing the transmission output is generated. If the arrangement is made as above, the control will become simple correspondingly.

Figure 17:
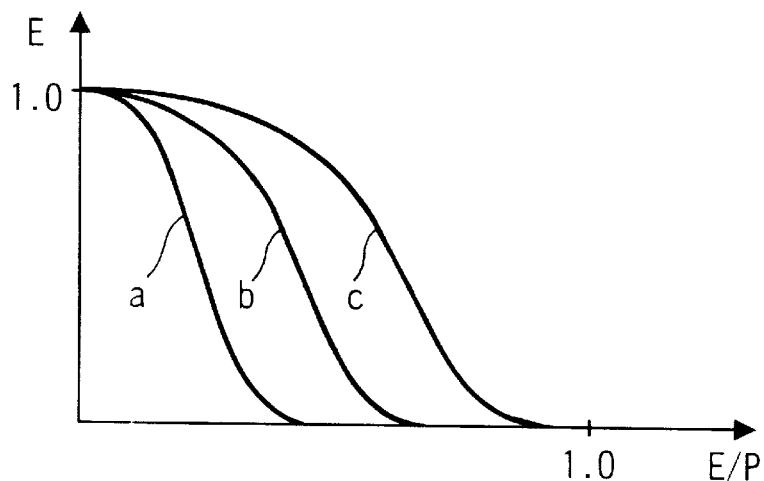
FIG. 17 is a characteristic graph showing an example of switching the weighting operation.

The present example is arranged to detect fluctuation of the E/P value by the fluctuation detecting circuit 439. Therefore, the weighting condition, i.e., the function value of the decreasing function may be changed by the weighting processing circuit 440 on the basis of the detection result. FIG. 17 is a diagram showing an example of such a case. For example, three kinds of functions a, b, c shown in FIG. 17 are prepared as the decreasing function, and when the value of E/P detected by the fluctuation detecting circuit 439 is fluctuated most (e.g., the interference amount changes greatly at every burst due to a frequency hopping), the decreasing function a is selected to apply large weighting, the decreasing function to be selected is changed to one having a characteristic b or c in accordance with decrease of fluctuation of the E/P value, and when the fluctuation stays under the steady noise, the decreasing function of the characteristic c is selected to apply the smallest weighting. In this way, data with proper weighting can be obtained.

While in this case the fluctuation is detected from the E/P value by the fluctuation detecting circuit 439, the fluctuation may be detected only from the fluctuation of the noise power estimation value E.

Figure 18:
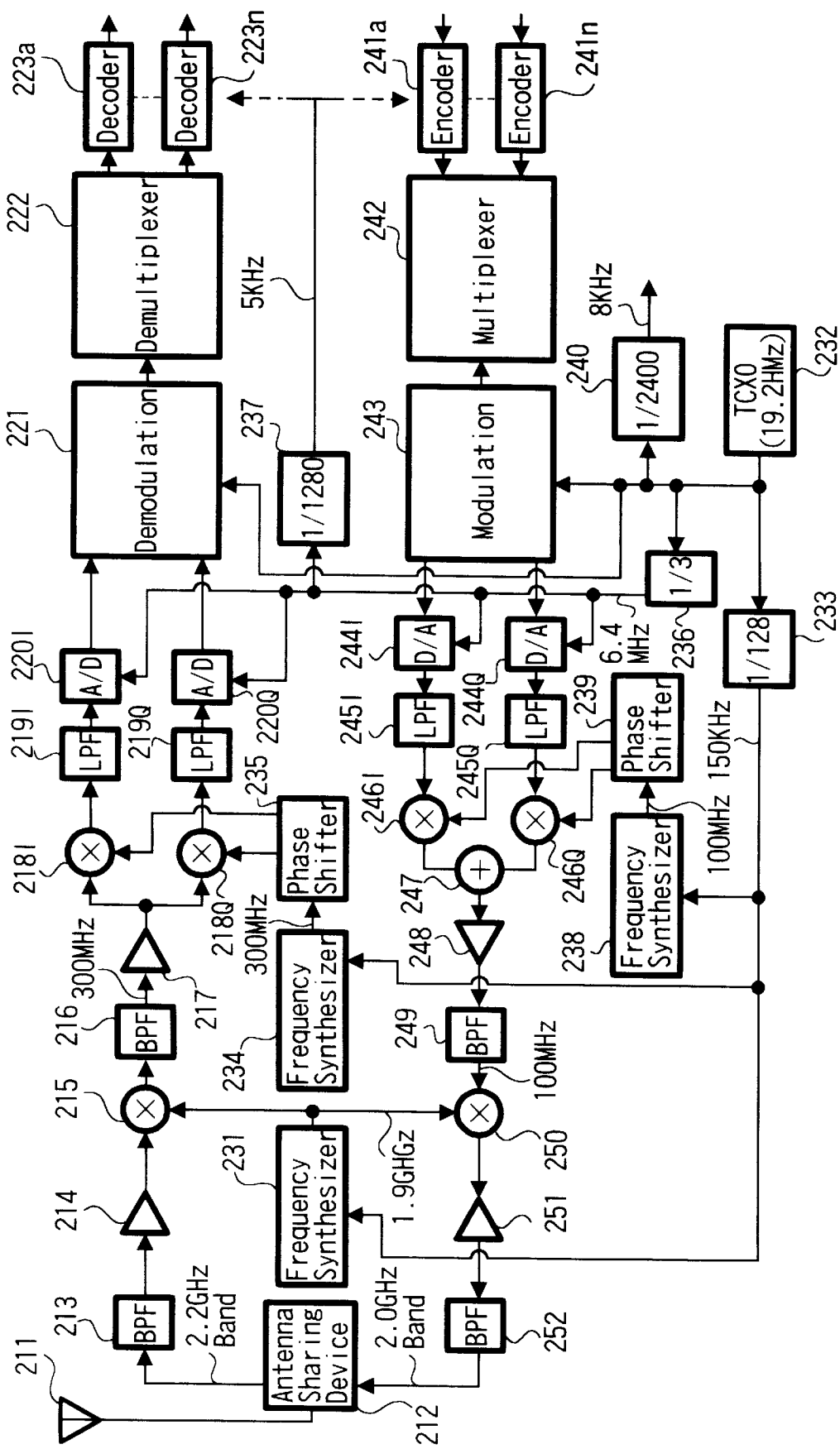
FIG. 18 is a block diagram showing an arrangement of a base station according to the embodiment.

An arrangement of the base station will be described below with reference to FIG. 18. The arrangement of the base station for carrying out transmission and reception is fundamentally the same as the arrangement of the terminal apparatus side. But the base station is different from the terminal apparatus in an arrangement of multiple access which enables a plurality of terminal apparatus to access at a time.

Initially, an arrangement of the reception system shown in FIG. 18 will be described. An antenna 211 serving for transmission and reception is connected to an antenna sharing device 212. The antenna sharing device 212 is connected at its reception signal output side with a band-pass filter 213, a reception amplifier 214 and a mixer 215 in series. The band-pass filter 213 extracts 2.2 GHz band. The mixer 215 mixes an extracted signal with a frequency signal of 1.9 GHz output from a frequency synthesizer 231 so that a reception signal is converted into an intermediate signal of 300 MHz band. The frequency synthesizer 231 is formed of a PLL circuit (phase-locked loop circuit). The frequency synthesizer is a synthesizer for generating signals of 1.9 GHz with an interval of 150 kHz (i.e., one band slot interval) on the basis of a signal of 150 kHz generated by frequency-dividing a signal of 19.2 MHz output from a temperature compensation crystal reference oscillator (TCXO) 232 by a 1/128 frequency divider 233. Other synthesizers, which will be described later on, utilized in the base station are similarly formed of the PLL circuit.

The intermediate frequency signal output from the mixer 215 is supplied through a band-pass filter 216 and a reception amplifier 217 to two mixers 218I, 218Q useful for demodulation. A frequency signal of 300 MHz output from a frequency synthesizer 234 is converted into signals of two systems of which phases are shifted from each other by 90 degrees by a phase shifter 235. One of the two system frequency signals is supplied to the mixer 218I while the other of the same is supplied to the mixer 218Q so that they are mixed with the intermediate frequency signals, respectively. Thus, an I-component and a Q-component contained in the received data are extracted. The frequency synthesizer 234 is a synthesizer for generating a signal of 300 MHz band on the basis of a signal of 150 kHz generated by the frequency division with the 1/128 frequency divider 233.

The extracted I-component is supplied through a low-pass filter 219I to an analog-to-digital converter 220I in which the component is converted into digital I data. The extracted Q-component is supplied through a low-pass filter 219Q to an analog-to-digital converter 220Q in which the component is converted into digital Q data. Each of the analog-to-digital converters 220I, 220Q utilizes a signal of 6.4 MHz generated by frequency-dividing a signal of 19.2 MHz output from the TCXO 232 by a 1/3 frequency divider 236 as a clock for conversion.

Then, the digital I data and the digital Q data output from the analog-to-digital converters 220I, 220Q are supplied to a demodulating unit 221 from which demodulated data is supplied to a demultiplexer 222, in which the data supplied thereto is classified into data from respective terminal apparatus and the classified data are supplied separately to decoders 223a, 223b, . . . , 223n of which number corresponds to a number of terminal apparatus permitted to access at a time (six terminals per one band slot). The demodulating unit 221, the demultiplexer 222 and the decoders 223a, 223b, . . . , 223n are supplied with the signal of 19.2 MHz output from the TCXO 32 as a clock as it is, and also supplied with a signal of 5 kHz generated by frequency-dividing a signal of 6.4 MHz output from the 1/3 frequency divider 236 by a frequency divider 237 as slot timing data.

Next, an arrangement of a transmission system of the base station will be described. A multiplexer 242 synthesizes transmission data which are separately encoded by encoders 241a, 241b, . . . , 241n prepared for respective opponents (terminal apparatus) capable of communicating at a time. An output of the multiplexer 242 is supplied to a modulation unit 243 in which modulation processing for transmission is carried out, whereby digital I data and digital Q data for transmission are generated. The respective encoders 241a to 241n, the multiplexer 242 and the modulation unit 243 are directly supplied with the signal of 19.2 MHz output from the TCXO 32 as a clock as it is, and also supplied with the signal of 5 kHz output from the 1/1280 frequency divider 237 as a clock.

The digital I data and the digital Q data output from the modulation unit 243 are supplied to digital-to-analog converters 244I and 244Q in which the digital data are converted into an analog I signal and an analog Q signal. The converted I signal and Q signal are supplied through low-pass filters 245I and 245Q to mixers 246I and 246Q. Further, a frequency signal of 100 MHz output from a frequency synthesizer 238 is converted by a phase shifter 239 into two system signals of which phases are shifted from each other by 90 degrees. One of the two system frequency signals is supplied to the mixer 246I while the other of the same is supplied to the mixer 246Q, whereby the frequency signals are mixed with the I signal and the Q signal, respectively, so as to form signals falling in a 300 MHz band. Both of the signals are supplied to an adder 247 in which is carried out an orthogonal modulation to unify them into a single system signal. The frequency synthesizer 238 is a synthesizer for generating a signal of 100 MHz band based on the signal of 150 kHz generated by a frequency-division with a 1/128 frequency-divider 233.

Then, the signal modulated into the signal of 100 MHz band output from the adder 247 is supplied through a transmission amplifier 248 and a band-pass filter 249 to a mixer 250, in which the signal is added with a frequency signal of 1.9 GHz band output from the frequency synthesizer 231 so as to convert the signal into a signal of a transmission frequency of 2.0 GHz band. The transmission signal frequency-converted into the transmission frequency is supplied through a transmission amplifier 251 and a band-pass filter 252 to the antenna sharing device 212 so that the signal is transmitted from the antenna 211 connected to the antenna sharing device 212 in a wireless fashion.

Further, the signal of 19.2 MHz output from the TCXO 232 is supplied to a 1/2400 frequency-divider 240 to convert the signal into a signal of 8 kHz, and the signal of 8 kHz is supplied to a circuit of a speech processing system (not shown). That is, the base station of the present example is arranged to sample a speech signal, which is transmitted between the terminal apparatus and a base station, at a rate of 8 kHz (or oversampling at a rate of an integral multiple of the rate), and thus the 1/2400 frequency divider 240 produces a clock necessary for speech data processing circuits such as an analog-to-digital converter and a digital-to-analog converter of a speech signal or a digital signal processor (DSP) for processing for compression and expansion on speech data and so on.

Figure 19:
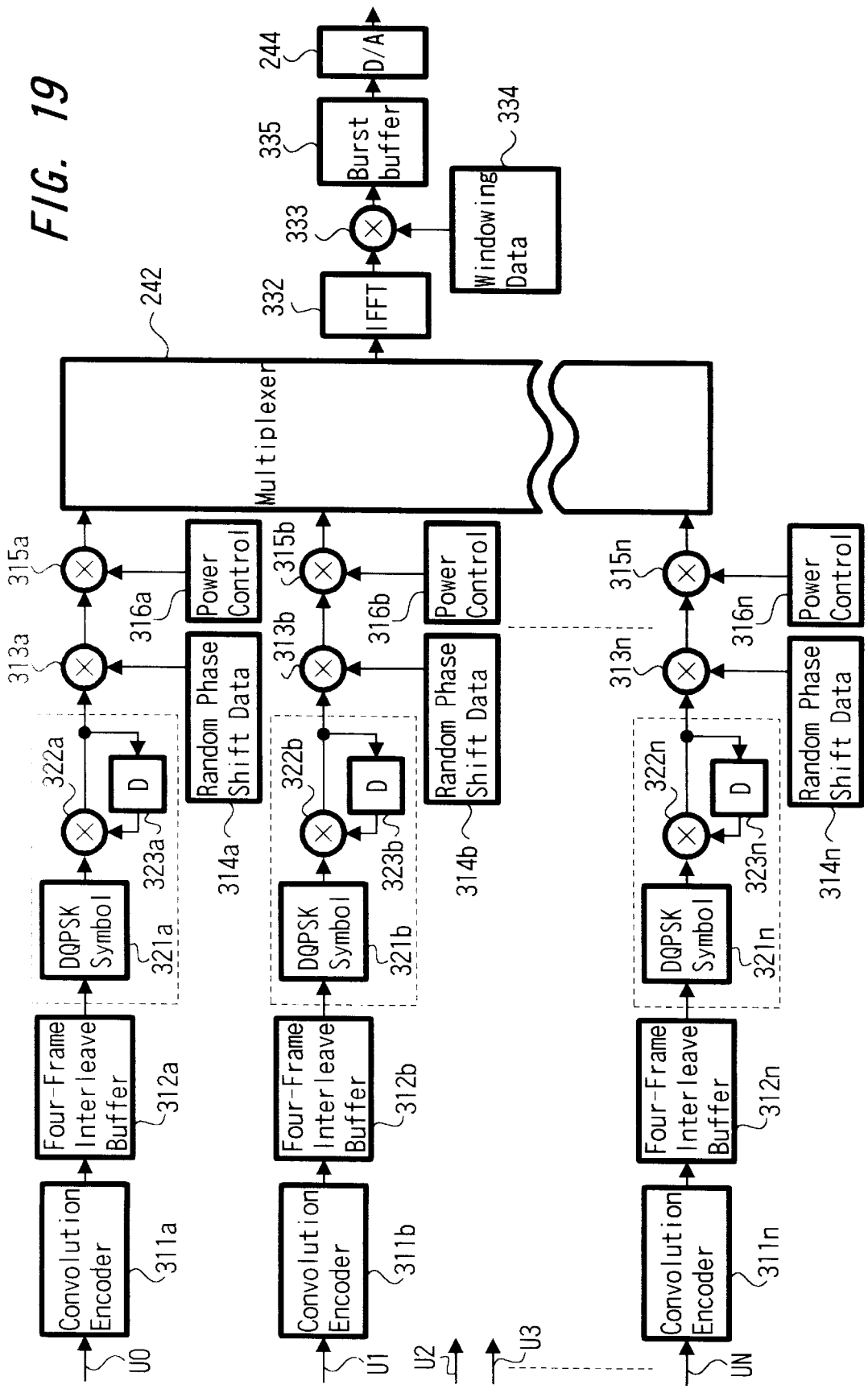
FIG. 19 is a block diagram showing a modulation processing of the base station according to the embodiment.

Next, an arrangement of the base station for encoding and modulating transmission data will be described in detail with reference to FIG. 19. In this case, it is supposed that N (N is an arbitrary number) terminal apparatus (users) carry out multiple access at a time. Thus, transmission signals U0, U1, . . . , UN to respective users of the terminal apparatus are supplied to different convolution encoders 311a, 311b, . . . , 311n, respectively, in each of which convolution encoding is carried out separately. The convolution encoding is carried out with a constraint length k=7 and a coding rate R=1/3, for example.

Then, data convolution-encoded by respective systems are supplied to four-frame interleave buffers 312a, 312b, . . . , 312n, respectively, in each of which interleave is carried out on data over four frames (20 msec.). Outputs of respective interleave buffers 312a, 312b, . . . , 312n are supplied to DQPSK encoders 320a, 320b, . . . , 320n, respectively, in each of which DQPSK modulation is carried out. Specifically, DQPSK symbol generating circuits 321a, 321b, . . . , 321n generates corresponding symbols based on the supplied data. The symbols are supplied to one input of multipliers 322a, 322b, . . . , 322n, and multiplied outputs of the multipliers 322a, 322b, . . . , 322n are supplied to respective delay circuits 323a, 323b, . . . , 323n in each of which the symbol is delayed by one symbol amount and fed back to the other input. Thus, DQPSK modulation is carried out. Then, the data subjected to the DQPSK modulation are supplied to the multipliers 313a, 313b, . . . , 313n, respectively, in which random phase shift data separately output from random phase shift data generating circuits 314a, 314b, . . . , 314n are multiplied with modulation data. Thus, respective data are changed in phase at random apparently.

Outputs of the respective multipliers 313a, 313b, 313n are supplied to other multipliers 314a, 314b, . . . , 314n in each of which the output are multiplied with control data output from transmission power control circuits 316a, 316b, . . . , 316n provided at every system. Thus, the transmission output is adjusted. This adjustment of transmission output is carried out based on output control data contained in the burst signal transmitted from a terminal apparatus connected to each system. The control data has been described in detail with reference to FIG. 11. That is, if control data of (0, 0) and (1, 1) of (I, Q) data are discriminated from reception data, then the transmission output is maintained as it is, if control data of (0, 1) is discriminated from the reception data, then the transmission output is increased, and if control data of (1, 0) is discriminated from the reception data, then the transmission output is lowered.

The control data of (1, 1) is data which is not actually present on the transmission side. However, when the data of (1, 1) is determined on the reception side, the output is prevented from being changed. Owing to the setting, if the control data of (1, 0) (i.e., data making the output to be lowered) is deviated in phase by 90 degrees due to any cause, and erroneously determined as data of (1, 1) or (0, 0) on the reception side, then it is possible to avoid at least an erroneous processing in the inverse direction which increases the output. Similarly, if the control data of (0, 1) (i.e., data making the output to be increased) is deviated in phase by 90 degrees due to any cause, and erroneously determined as data of (1, 1) or (0, 0) on the reception side, then it is possible to avoid at least an erroneous processing of the output.

The arrangement shown in FIG. 19 will be described again. The transmission data output from the respective multipliers 314a, 314b, . . . , 314n are supplied to a multiplexer 242 and then synthesized thereby. When the transmission data are synthesized by the multiplexer 242 according to this embodiment, a frequency at which the transmission data are synthesized can be switched by a unit of 150 kHz. By the switching control, the frequency of the burst signal supplied to each terminal apparatus is switched. Specifically, in this embodiment, as described with reference to FIGS. 4A TO 4G and so on, an operation of switching a frequency by a band slot unit which is called a frequency hopping is carried out, and the frequency switching operation is realized by switching processings of the multiplexer 242 upon the synthesizing operation.

The data synthesized by the multiplexer 242 is supplied to an FFT circuit 332 which carries out the fast Fourier inverse transform for the data, and then obtains a so-called multi-carrier data modulated so as to have twenty two subcarriers having frequencies at every 6.25 kHz per one band slot and converted into the real time. Then, the data converted into the real time signal by the fast Fourier inverse transform is supplied to a multiplier 333 which multiplies it with a time waveform output from a windowing data generating circuit 334. As shown in FIG. 4A, for example, the time waveform is a waveform whose length $T_U$ of one waveform is about $200\mu$ second (i.e., one time slot period). However, at each of its both end portions $T_{TR}$ thereof (about $15\mu$ second), a level of the waveform is smoothly changed. When the waveform is multiplied with the time waveform as shown in FIG. 10B, adjacent time waveforms are partially overlapped with each other.

Then, the signal multiplied with the time waveform by the multiplier 333 is supplied through a burst buffer 335 to a digital/analog converter 244 (corresponding to the converters 244I, 244Q shown in FIG. 18) which converts it into an analog I signal and an analog Q signal. Then, the analog signals are processed for transmission in the arrangement shown in FIG. 18.

In the base station according to this embodiment, since the band slot switching processing called the frequency hopping is carried out by the multiplexer 242 in the middle of the modulation processing as described above, it is possible to simplify the arrangement of the transmission system. Specifically, when the base station simultaneously handles a plurality of paths of signals as described in this embodiment, it was necessary to convert a frequency of a signal of each of paths into that of a corresponding band slot (channel) to then synthesize the signals, and hence, in the transmission system, a set of the circuits up to the mixer 250 shown in FIG. 18 is required for each of the paths. On the other hand, in the base station of this embodiment, only one system of the circuits is sufficient in the circuits succeeding the multiplexer 242, and hence the arrangement of the base station can be simplified to that extent.

Figure 20:
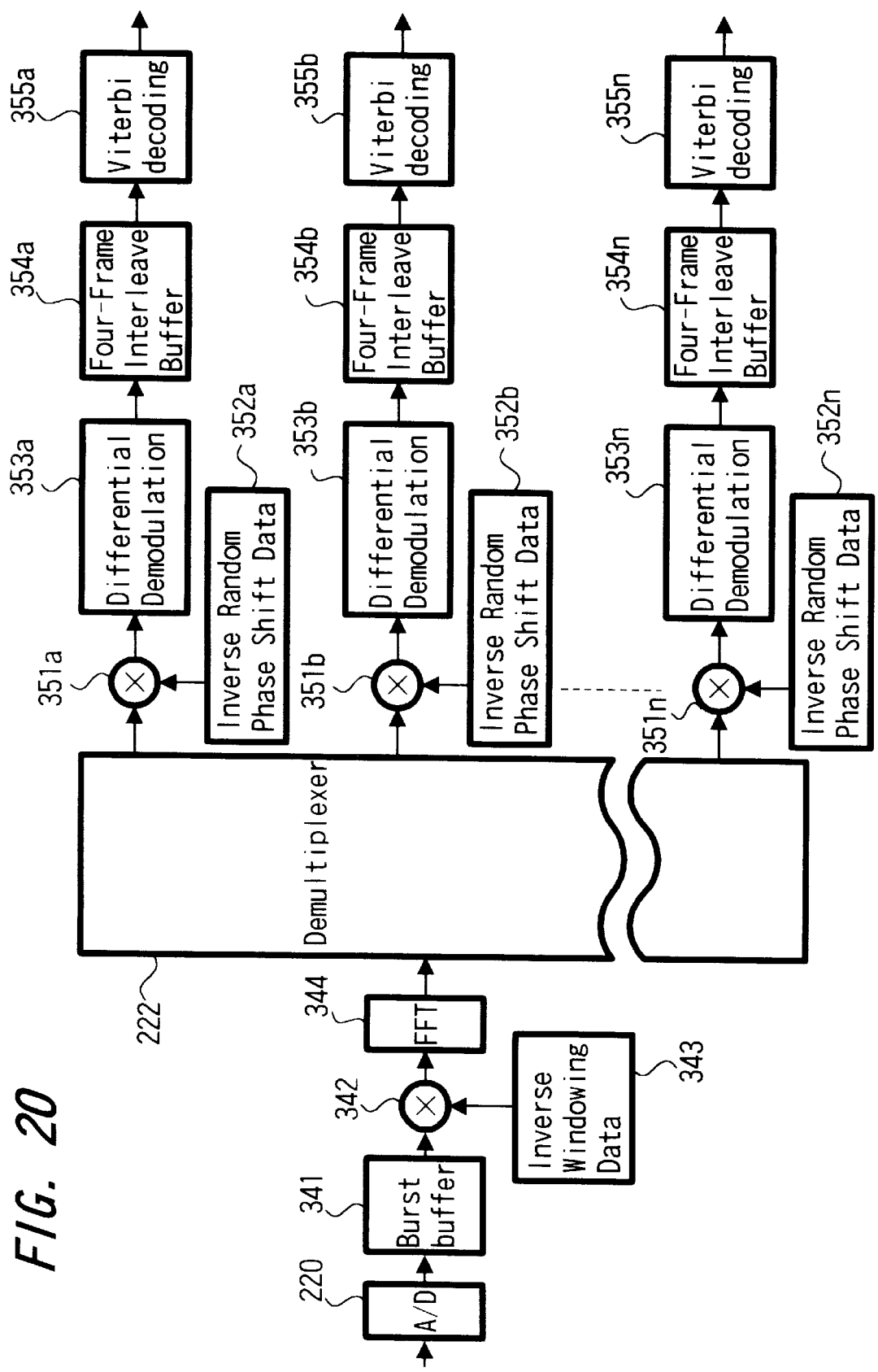
FIG. 20 is a block diagram showing a demodulation processing of the base station according to the embodiment.

An arrangement for demodulating received data in the base station to decode it will be described in detail with reference to FIG. 20. A digital I data and a digital Q data converted by an analog/digital converter 220 (corresponding to the analog/digital converters 220I and 220Q in FIG. 18) are supplied through a burst buffer 341 to a multiplier 342. The multiplier multiplies them with a time waveform output from an inverse windowing data generating circuit 343. The time waveform is a time waveform having a shape shown in FIG. 10A and also a time waveform having a length $T_M$ of 160 μsec which is shorter than that used upon transmission.

The received data multiplied with the time waveform is supplied to a FFT circuit 344 and subjected to fast Fourier transform thereby to carry out a processing converting a frequency axis into a time axis. Thus, the data each transmitted after modulation in the form of 22 subcarriers at an interval of 6.25 kHz per one band slot is obtained from the real time signal. Then, the data subjected to the fast Fourier transform is supplied to a demultiplexer 222 and divided into data which is as much as the terminal apparatus permitted in multiple access to the base station simultaneously. When the data is divided by the demultiplexer 222 according to this embodiment, the frequency used for the above division is switch ed by a unit of 150 kHz and this switching operation is controlled, thereby frequencies of the burst signals transmitted from the respective terminal apparatus being switched. Specifically, in this embodiment, as described with reference to FIGS. 4A TO 4G and so on, the operation of switching the frequency of a band slot unit which is called the frequency hopping is carried out periodically, and the frequency switching operation carried out on the reception side is realized by time-dividing processings of the demultiplexer 222 upon reception of the received data.

The respective received data divided by the demultiplexer 222 are independently supplied to multipliers 351a, 351b, ..., 351n provided so as to be as much as the terminal apparatus of the number N permitted in simultaneous multiple access to the base station. The multipliers 351a, 351b, ..., 351n respectively multiply the divided data with inverse random phase shift data (data changed in synchronization with the random phase shift data on the transmission side) output from the inverse random phase shift data generating circuits 352a, 352b, ..., 352n and returns the received divided data to the data having the original phases in the respective systems.

The respective data from the inverse random phase shift data generating circuits are supplied to delay detection circuits 353a, 353b, ..., 353n and delay-detected (differentially demodulated) thereby. The delay detection circuits supply the delay detected data to four-frame interleave buffers 354a, 354b, ..., 354n which restores the data of four frames interleaved upon transmission to the data of the original data arrangement. The four-frame interleave buffers supply the de-interleaved data to Viterbi decoders 355a, 355b, ..., 355n for subjecting them to Viterbi decoding. The decoders supply the data subjected to the Viterbi decoding as the received data to received-data processing circuits (not shown) at the succeeding stages.

According to the base station of this embodiment, since the data dividing processing including the band slot switching processing called the frequency hopping is carried out by the demultiplexer 222 provided in the middle of the demodulation processing, similarly to the transmission system, it is possible to simplify the arrangement of the reception system. Specifically, when the base station simultaneously handles the signals of plural paths as described in this embodiment, it is necessary in the prior art to convert the frequencies of the signals of the band slots (channels) corresponding to the respective the signals of paths into the intermediate frequency signals and then to carry out the processings up to the fast Fourier transform to supply them to the respective multipliers 351a to 351n, and hence in the reception system, sets, which are equal to the number of the paths, of the circuits from the mixer 215 to the demodulating unit 221 shown in FIG. 18 are required. On the other hand, since the base station according to this embodiment requires only one system of the circuits in the transmission system preceding to the demultiplexer 222, it is possible to simplify the arrangement of the base station to that extent.

Values of the frequencies, time, coding rates and so on are described in this embodiment by way of example, and hence the present invention is not limited to the above embodiment. It is needless to say that the present invention can be applied to the modulation processing other than the DQPSK modulation in view of the modulation system. In particular, the processing of detecting the noise power described in the above embodiment can be applied to various systems of receiving the differential-demodulated signals.

While in the above embodiment the processing of detecting the circuit quality from the estimated value of the noise power, the processing of obtaining the soft decision value in the Viterbi decoding,. the circuit quality and the soft decision value may be obtained in the base station by similar processings.

According to the receiving method of the present invention, it is possible to accurately detect the noise power without any influence of the level fluctuation of the received signal or the like.

In this case, since the difference between the again differentially modulated signal and the symbol of the received signal is squared and then averaged to detect the noise power of the transmission signal. Therefore, it is possible to obtain the satisfactory noise power with a simple processing.

When the noise power of the transmission signal is detected by squaring the above difference and then averaging the same, the circuit quality information is obtained from calculation from a ratio of a value obtained by squaring the symbol of the received signal and then averaging the same to a value obtained by squaring the difference between the again differentially modulated signal and the symbol of the received signal and then averaging the squared difference. Therefore, it is possible to satisfactorily detect the circuit quality with a simple processing.

When the circuit quality information is obtained from the value of the above ratio, the value obtained by multiplying the value of the ratio with the predetermined decreasing function is employed as the circuit quality information. Therefore, it is possible to obtain the more satisfactory circuit quality information.

Since the value multiplied with the decreasing function is employed as the soft decision value in the Viterbi decoding, it is possible to obtain the satisfactory soft decision value.

When the circuit quality information obtained by the above processing is equal to or smaller than the first value, it is determined that the transmission power is excessive, while when the circuit quality information is equal to or larger than the second value, it is determined that the transmission power is too small. The data used for controlling the transmission side is created. Therefore, it is possible to carry out the control for the transmission power which can suppress interference to another signal.

Since the first value and the second value are set equal to each other in this case, it is sufficient to handle as the data used for controlling the transmission side only two kinds of data indicating the circuit quality information is smaller or larger than the reference value. Therefore, it is possible to control the transmission output with a simple processing.

Since a plurality of the above decreasing functions are prepared and the decreasing function to be used is switched depending upon the detected circuit quality, it is possible to obtain more satisfactory circuit quality information responding to the transmission state at that time.

According to the receiving apparatus of the present invention, it is possible to obtain the receiving apparatus which can accurately detect the noise power without any influence of the level fluctuation of the received signal or the like.

In this case, since the difference between the again differentially modulated signal and the symbol of the received signal is squared and then averaged to detect the noise power of the transmission signal. Therefore, it is possible to obtain the satisfactory noise power with a simple circuit arrangement.

When the noise power of the transmission signal is detected by squaring the above difference and then averaging the same, the circuit quality information is obtained from calculation from a ratio of a value obtained by squaring the symbol of the received signal and then averaging the same to a value obtained by squaring the difference between the again differentially modulated signal and the symbol of the received signal and then averaging the squared difference. Therefore, it is possible to satisfactorily detect the circuit quality with a simple circuit arrangement.

When the circuit quality information is obtained from the value of the above ratio, the value obtained by multiplying the value of the ratio with the predetermined decreasing function is employed as the circuit quality information. Therefore, it is possible to obtain the more satisfactory circuit quality information.

Since the value multiplied with the decreasing function is employed as the soft decision value in the Viterbi decoding, it is possible to obtain the satisfactory soft decision value.

When the circuit quality information obtained by the above arrangement is equal to or smaller than the first value, it is determined that the transmission power is excessive, while when the circuit quality information is equal to or larger than the second value, it is determined that the transmission power is too small. The data used for controlling the transmission side is created by the control means. Therefore, it is possible to carry out the control for the transmission power which can suppress interference to another signal.

Since the first value and the second value are set equal to each other in this case, it is sufficient to handle as the data used for controlling the transmission side only two kinds of data indicating the circuit quality information smaller or larger than the reference value. Therefore, it is possible to control the transmission output with a simple arrangement.

Since a plurality of decreasing functions are prepared as the above decreasing function and the decreasing function to be used is switched depending upon the detected circuit quality, it is possible to obtain more satisfactory circuit quality information responding to the transmission state at that time.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A noise detection apparatus comprising;
   demodulating means for demodulation an input signal;
   determining means for determining a status of an output signal of said demodulating means;
   modulating means for modulating an output of said determining means; and
   subtracting means for subtracting said input signal from said output signal of said modulating means, wherein a noise power is detected from an output of said subtracting means.

2. The noise detection apparatus as claimed in claim 1 wherein said demodulating means comprises a differential demodulator with a delay means, and said modulating means executes differential modulation on said output of said determining means.

3. The noise detection apparatus as claimed in claim 1 further comprising:
   first squaring means for squaring said output signal of said subtracting means; and
   first averaging means for averaging an output signal of said first squaring means, wherein the noise power is detected from an output of said first averaging means.

4. A circuit quality detection apparatus comprising:
   demodulating means for demodulating an input signal;
   determining means for determining a status of an output signal of said demodulating means;
   modulating means for modulating an output of said determining means;
   subtracting means for producing an output signal representing a difference between said input signal and an output of said modulating means;
   first squaring means for squaring said output signal of said subtracting means;
   first averaging means for averaging an output signal of said first squaring means;
   second squaring means for squaring the input signal;
   second averaging means for averaging an output signal of said second squaring means; and
   ratio calculating means for calculating a ratio of an output of said first averaging means to an output of said second averaging means, wherein said circuit quality is detected from an output of said ratio calculating means.

5. A soft decision decoding apparatus comprising;
   demodulating means for demodulating an input signal;
   determining means for determining a status of an output signal of said demodulating means;
   multiplying means for multiplying an output of said determining means with an output of said demodulating means;
   subtracting means for producing an output signal representing a difference between said input signal and an output signal of said multiplying means;
   first squaring means for squaring said output signal of said subtracting means;
   first averaging means for averaging an output signal of said first squaring means;
   second squaring means for squaring the input signal;
   second averaging means for averaging an output signal of said second squaring means;
   ratio calculating means for calculating a ratio of an output of said first averaging means to an output of said second averaging means;
   weight function generating means for generating a weight function from an output of said ratio calculating means; and
   soft decision decoding means for soft-decoding a signal formed of an output signal of said weight function generating means and said output signal of said demodulating means.

6. The soft decision decoding apparatus as claimed in claim 5, wherein said weight function is a decreasing function.

7. The soft decision decoding apparatus as claimed in claim 6, wherein said decreasing function is expressed in a form of $e^{-x^2}$, where X is said ratio calculated by said ratio calculating means.

8. The soft decision decoding apparatus as claimed in claim 5, wherein said soft decision decoding means includes a Viterbi decoder.

9. The soft decision decoding apparatus as claimed in claim 5 further comprising:

fluctuation detecting means for detecting a time domain fluctuation of a predetermined signal derived from said input signal, wherein said weight function generated by said weight function generating means is changed in response to an output of said fluctuation detecting means.

10. The soft decision decoding apparatus as claimed in claim 9, wherein said predetermined signal comprises said output signal of said first averaging means.

11. The soft decision decoding apparatus as claimed in claim 9, wherein said predetermined signal comprises said output signal of said first averaging means and said output signal of said second averaging means.

12. A receiving apparatus comprising;

RF signal processing means for processing a received RF signal;

RF demodulating means for demodulating an output signal of said RF signal processing means; and decoding means for decoding an output signal of said RF demodulating means, wherein said decoding means includes a differential demodulating circuit for demodulating an output signal of said RF demodulating means, determining means for determining a status of an output signal of said differential demodulating circuit, multiplying means for multiplying an output of said determining means, subtracting means for producing an output signal representing a difference between said output signal of said RF demodulating means and an output signal of said multiplying means, first squaring means for squaring said output signal of said subtracting means, second squaring means for squaring the output signal of said RF demodulating means, first averaging means for averaging an output signal of said first squaring means, second averaging means for averaging an output signal of said second squaring means, ratio calculating means for calculating a ratio of an output of said first averaging means to an output of said second averaging means, weight function generating means for generating a weight function from an output of said ratio calculating means, and soft decision decoding means for soft-encoding a signal formed by an output signal of said weight function generating means and said output signal of said differential demodulating circuit.

13. The receiving apparatus as claimed in claim 12, wherein said weight function is a decreasing function.

14. The receiving apparatus as claimed in claim 13, wherein said decreasing function is expressed in a form of $e^{-x^2}$, where X is said ratio calculated by said ratio calculating means.

15. The receiving apparatus as claimed in claim 12, wherein said soft decision decoding means includes a Viterbi decoder.

16. The receiving apparatus as claimed in claim 12 further comprising:

fluctuation detecting means for detecting a time domain fluctuation of a predetermined signal derived from said input of said first averaging means and said output of said second averaging means, wherein said weight function generated by said weight function generating means is changed in response to an output of said fluctuation detecting means.

17. The receiving apparatus as claimed in claim 16, wherein said predetermined signal comprises said output signal of said first averaging means.

18. The receiving apparatus as claim 16, wherein said predetermined signal comprises said output signal of said first averaging means and said output signal of said second averaging means.

19. A communication apparatus comprising:

RF signal processing means for processing a received RF signal;

RF demodulating means for demodulating an output signal of said RF signal processing means;

decoding means for decoding an output signal of said RF demodulating means;

encoding means for encoding an information signal fed thereto;

RF modulating means for modulating an output signal of said encoding means; and transmitting signal processing means for processing an output signal of said RF modulating means, wherein said decoding means includes a differential demodulating circuit for demodulating said output signal of said RF modulating means, determining means for determining a status of an output signal of said demodulating means, multiplying means for multiplying an output of said determining means, subtracting means for producing an output signal representing a difference between said output signal of said RF modulating means and an output signal of said multiplying means, first squaring means for squaring said output signal of said subtracting means, second squaring means for squaring the output of said RF modulating means, first averaging means for averaging an output signal of said first squaring means, second averaging means for averaging an output signal of said second squaring means, and ratio calculating means for calculating a ratio of an output of said first averaging means to an output of said second averaging means, wherein an output power of said transmitting signal processing means is controlled by information of circuit quality derived from an output of said ratio calculating means.

20. The communication apparatus as claimed in claim 19 further comprising:

memory means for memorizing information to change said output power of said transmitting signal processing means; and selecting means for reading said information from said memory means in accordance with said information of circuit quality and for generating a signal to control said output power of said transmitting signal processing means.

21. The communication apparatus as claimed in claim 19, wherein said RF demodulating means includes means for executing orthogonal demodulation, and said decoding means includes means for executing Fourier transform, phase demodulation, and Viterbi decoding.

22. The communication apparatus as claimed in claim 19, wherein said RF demodulating means includes means for executing orthogonal demodulation, and Viterbi decoding, said encoding means includes means for executing convolutional encoding, phase modulation, and inverse Fourier transform, and said RF modulating means includes means for executing orthogonal modulation.

23. The communication apparatus as claimed in claim 21, wherein said decoding means includes means for multiplying inverse random phase shift data between processes of said Fourier transform and said phase demodulation.

24. The communication apparatus as claimed in claim 22, wherein said decoding means includes means for multiplying inverse random phase shift data between processes of said Fourier transform and phase demodulation, and said encoding means multiplies random phase shift data between processes of said phase modulation and said inverse Fourier transform.

25. A noise detection method comprising the steps of:
   demodulating an input signal;
   determining a status of an output signal of said demodulating step;
   modulating an output of said determining step;
   subtracting between said input signal and an output signal of said modulating step; and
   detecting a noise power from an output of said subtracting step.

26. The noise detection method as claimed in claim 25, wherein said demodulating step comprises the steps of differential demodulating and delaying, and said modulating step includes executing differential modulation.

27. The noise detection method as claimed in claim 25 comprising the further steps of:
   squaring an output signal of said subtracting step; and
   averaging an output signal of said first squaring step, wherein said noise power is detected from an output of said averaging step.

28. A circuit quality detection method comprising steps of:
   demodulating an input signal;
   determining a status of an output signal of said demodulating step;
   modulating an output of said determining step;
   subtracting between said input signal and an output signal of said modulating step;
   first squaring an output signal of said subtracting step;
   first averaging an output signal of said first squaring step;
   second squaring the input signal;
   second averaging an output signal of said second squaring step;
   calculating a ratio of an output of said first averaging step to an output of said second averaging step; and
   detecting an information of circuit quality from an output of said ratio calculating step.

29. A soft decision decoding method comprising the steps of:
   demodulating an input signal;
   determining a status of an output signal of said demodulating step;
   modulating an output of said determining step;
   subtracting between said input signal and an output signal of said modulating step;
   first squaring an output signal of said subtracting step;
   first averaging an output signal of said first squaring step;
   second squaring the input signal;
   second averaging an output signal of said second squaring step;
   calculating a ratio of an output of said first averaging step to an output of said second averaging step;
   generating a weight function from said ratio; and
   soft-decoding a predetermined signal including said input signal controlled by an output signal of said weight function generating step.

30. The soft decision decoding method as claimed in claim 29, wherein said step of generating a weight function includes generating a decreasing function.

31. The soft decision decoding method as claimed in claim 30, wherein said decreasing function is expressed in a form of $e^{-x^2}$, where X is said ratio.

32. The soft decision decoding method as claimed in claim 29, wherein said soft decision decoding step includes executing Viterbi decoding.

33. The soft decision decoding method as claimed in claim 29 further comprising the step of:
   detecting time domain fluctuation of a predetermined signal formed of at least one of an output of said first averaging and said second averaging, wherein said weight function is changed in accordance with an output of said fluctuation detecting step.

34. The soft decision decoding method as claimed in claim 33, wherein said predetermined signal is formed only from said output of said first averaging step.

35. The soft decision decoding method as claimed in claim 33, wherein said predetermined signal is formed from both said output of said first averaging step and said output of said second averaging step.

36. A receiving method comprising the steps of:
   processing a received RF signal;
   demodulating an output signal of said RF signal processing step; and
   decoding an output signal of said RF demodulating step, wherein said decoding step includes demodulating an input signal, determining a status of an output signal of said demodulating the input signal, multiplying an output of said determining step with said input signal, subtracting between said input signal and an output signal of said multiplying step, first squaring an output signal of said subtracting step, first averaging an output signal of said first squaring step, second squaring the input signal, second averaging an output signal of said second squaring step, calculating a ratio of an output of said first averaging step to an output of said second averaging step, generating a weight function from said ratio, and soft-decoding a predetermined signal including at least the demodulated input signal controlled by an output signal of said weight function generating step.

37. The receiving method as claimed in claim 36, wherein said weight function is a decreasing functions.

38. The receiving method as claimed in claim 37, wherein said decreasing function is expressed in a form of $e^{-x^2}$, where X is said ratio.

39. The receiving method as claimed in claim 36, wherein said soft decision decoding step includes executing Viterbi decoding.

40. The receiving method as claimed in claim 36 comprising the further step of:
   detecting a time domain fluctuation of a predetermined signal formed of at least one of the output of said first averaging and the output of the second averaging, wherein said weight function is changed in accordance with an output of said time domain fluctuation detecting step.

41. The receiving method as claimed in claim 40, wherein said predetermined signal is formed from said output signal of said first averaging.

42. The receiving method as claimed in claim 40, wherein said predetermined signal is formed from both said output signal of said first averaging and said output signal of said second averaging.

43. The receiving method as claimed in claim 36, wherein said RF demodulating step includes executing orthogonal demodulation, and said decoding step includes executing Fourier transform, phase demodulation, and Viterbi decoding.

44. The receiving method as claimed in claim 43, wherein said decoding step includes multiplying inverse random phase shift data between processing of said Fourier transform and said phase demodulation.

45. A communication method comprising the steps of:

RF signal processing a received RF signal;

RF demodulating an output signal of said RF signal processing step;

decoding an output signal of said RF demodulating step;

encoding a predetermined information signal;

RF modulating an output signal of said decoding step; and transmitting signal processing an output signal of said RF modulating step, wherein said decoding step demodulating an input signal, determining a status of an output of said demodulating step, multiplying an output of said determining step with the input signal, subtracting between said input signal and an output signal of said multiplying step, first squaring an output signal of said subtracting step, first averaging an output signal of said first squaring step, second squaring the input signal, second averaging an output signal of said second squaring step, and calculating a ratio of an output of said first averaging step of an output of said second averaging step, and wherein an output power of said transmitting signal processing step is controlled by an information of circuit quality derived from said ratio.

46. The communication method as claimed in claim 45 comprising the further steps of:

memorizing information to change a transmission power; and reading information from said memorizing step in accordance with said information of circuit quality for generating a signal to control an output power of said transmitting signal processing step.

47. The communication method as claimed in claim 45, wherein said RF demodulating step includes executing orthogonal demodulation, said decoding step includes executing Fourier transform, phase demodulation, and Viterbi decoding, said encoding step includes executing convolutional encoding, phase modulation, and inverse Fourier transform, and said RF modulating step includes executing orthogonal modulation.

48. The communication method as claimed in claim 47, wherein said decoding step includes multiplying inverse random phase shift data between processes of said Fourier transform and phase demodulation, and said encoding step includes multiplying random phase shift data between processes of said phase modulation and said inverse Fourier transform.

* * * * *